(12) United States Patent
Tandai et al.

(10) Patent No.: US 11,880,186 B2
(45) Date of Patent: Jan. 23, 2024

(54) MOBILE TERMINAL OPERATION THROUGH CONTROL SIGNALS TRANSMITTED AT PREDETERMINED TIMINGS

(71) Applicant: KABUSHIKI KAISHA TOSHIBA, Tokyo (JP)

(72) Inventors: Tomoya Tandai, Tokyo (JP); Toshihisa Nabetani, Kawasaki Kanagawa (JP); Koji Akita, Yokohama Kanagawa (JP); Miyuki Ogura, Tokyo (JP); Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 146 days.

(21) Appl. No.: 17/195,473

(22) Filed: Mar. 8, 2021

(65) Prior Publication Data

US 2022/0066419 A1  Mar. 3, 2022

(30) Foreign Application Priority Data

Sep. 1, 2020  (JP) .............................. JP2020-146839

(51) Int. Cl.
*H04W 64/00* (2009.01)
*G05B 19/414* (2006.01)
*H04W 56/00* (2009.01)

(52) U.S. Cl.
CPC ........ *G05B 19/414* (2013.01); *H04W 56/001* (2013.01); *H04W 64/006* (2013.01); *G05B 2219/33192* (2013.01)

(58) Field of Classification Search
CPC ....... G05B 19/414; G05B 2219/33192; H04W 56/001; H04W 64/006
See application file for complete search history.

(56) References Cited

U.S. PATENT DOCUMENTS

2015/0147976 A1* 5/2015 Wang ..................... A63H 27/02
455/65
2016/0271794 A1* 9/2016 Inaba ..................... B25J 9/1602
(Continued)

FOREIGN PATENT DOCUMENTS

JP  2007241522 A  9/2007
JP  2022044270    3/2022

OTHER PUBLICATIONS

Song, "5G NR Frame structure and Slot configuration", retrieved from: http://techbarnwireless.blogspot.com/2019/03/frame-structure-and-slot-configuration.html, 2019, 3 pages.

*Primary Examiner* — Yuwen Pan
*Assistant Examiner* — Angelica Perez
(74) *Attorney, Agent, or Firm* — Holtz, Holtz & Volek PC

(57) ABSTRACT

According to one embodiment, a system includes a processor and a transmitter. The processor is configured to generate a first control signal including a first instruction to operate at least part of a terminal with in a first validity and generate a second control signal including a second instruction to operate at least part of the terminal within a second validity period after an operation of the at least part of the terminal in accordance with the first instruction. The transmitter is configured to transmit the first control signal to the terminal at first timing and transmit the second control signal to the terminal at second timing after the first timing. An end of the first validity period is after the second validity timing.

19 Claims, 19 Drawing Sheets

(56) References Cited

U.S. PATENT DOCUMENTS

| | | | |
|---|---|---|---|
| 2019/0089519 A1* | 3/2019 | Nabetani | H04W 72/12 |
| 2020/0073376 A1* | 3/2020 | Yang | G05D 1/0022 |
| 2022/0076557 A1 | 3/2022 | Akita et al. | |

* cited by examiner

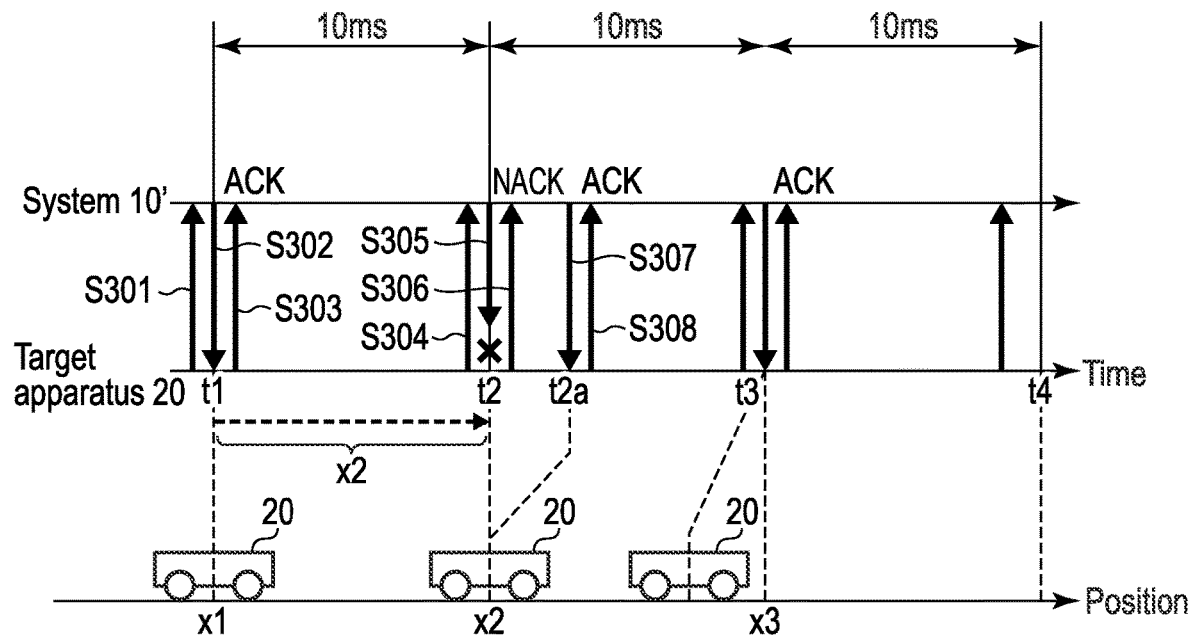
F I G. 19
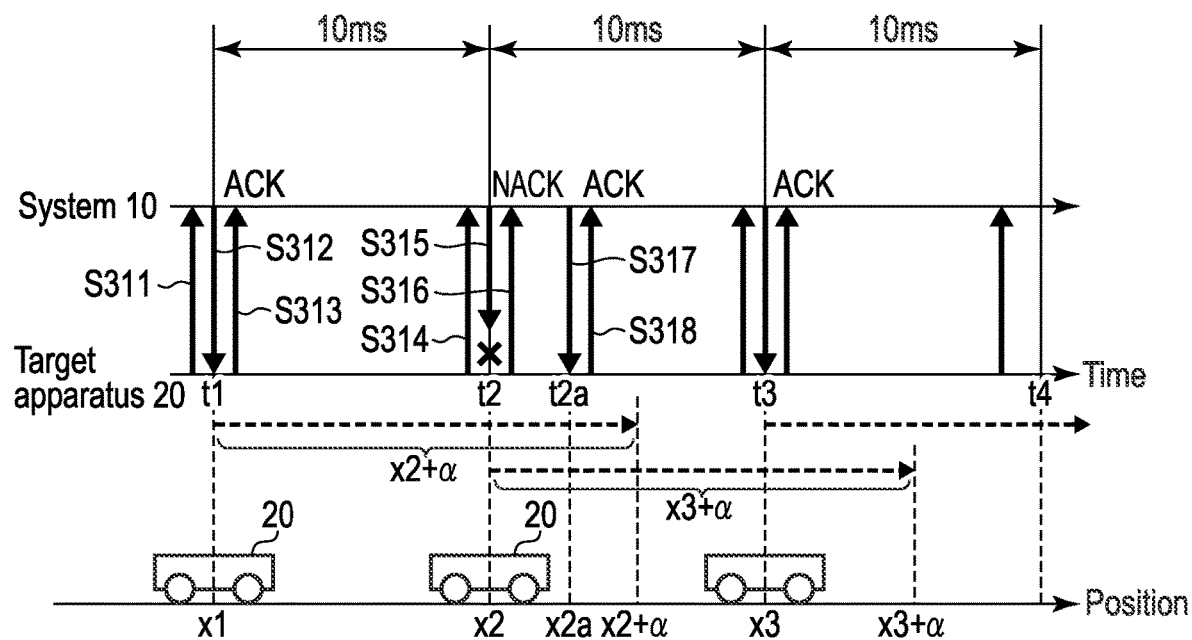
F I G. 20

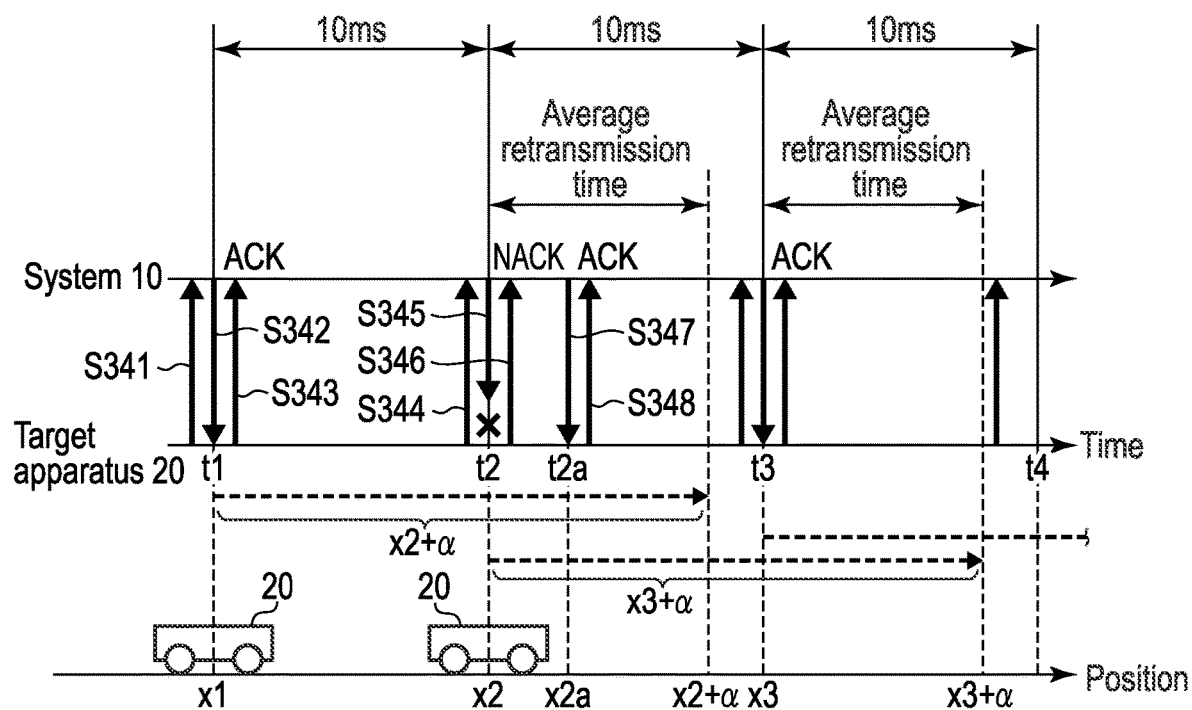
F I G. 23

MOBILE TERMINAL OPERATION THROUGH CONTROL SIGNALS TRANSMITTED AT PREDETERMINED TIMINGS

CROSS-REFERENCE TO RELATED APPLICATIONS

This application is baaed upon and claims the benefit of priority from Japanese Patent Application No. 2020-146839, filed Sep. 1, 2020, the entire contents of which are incorporated herein by reference.

FIELD

Embodiments described herein relate generally to a system and a server apparatus.

BACKGROUND

In recent years, there has been known a system to operate a terminal apparatus placed in a predetermined space (e.g., to control the movement of the terminal apparatus) by transmitting a control signal wirelessly to the terminal apparatus.

This system can operate the terminal apparatus appropriately by transmitting a control signal repeatedly to the terminal apparatus with predetermined timing. If, however, the terminal apparatus does not receive the control signal normally (that is, the terminal apparatus has failed to receive the control signal), it is stopped and its efficient operation cannot be performed.

BRIEF DESCRIPTION OF THE DRAWINGS

FIG. 19 is a sequence diagram showing an example of the operation of a system according to a comparative example of the fourth embodiment.

FIG. 20 is a sequence diagram showing an example of the operation of the system according to the fourth embodiment.

FIG. 23 is a sequence diagram showing an example of the operation of a system according to a third modification to the fourth embodiment.

DETAILED DESCRIPTION

In general, according to one embodiment, a system capable of communicating with a terminal is provided. The system includes a processor and a transmitter. The processor is configured to generate a first control signal including a first instruction to operate at least part of the terminal within a first validity period and generate a second control signal including a second instruction to operate at least part of the terminal within a second validity period after an operation of the at least part of the terminal in accordance with the first instruction. The transmitter is configured to transmit the first control signal to the terminal at first timing and transmit the second control signal to the terminal at second timing after the first timing. An end of the first validity period is after the second timing.

Various embodiments will be described hereinafter with reference to the accompanying drawings.

First Embodiment

First, an outline of the use mode of a system according to a first embodiment will be described with reference to FIG.

1. The system 10 according to the first embodiment is used to operate (control) at least part of a terminal apparatus (or a terminal) placed in a predetermined space by transmitting a control signal wirelessly to the terminal apparatus. The terminal apparatus receives the control signal from the system 10 via an antenna, and the system operates at least part of the terminal apparatus in response to the control signal.

Figure 1:
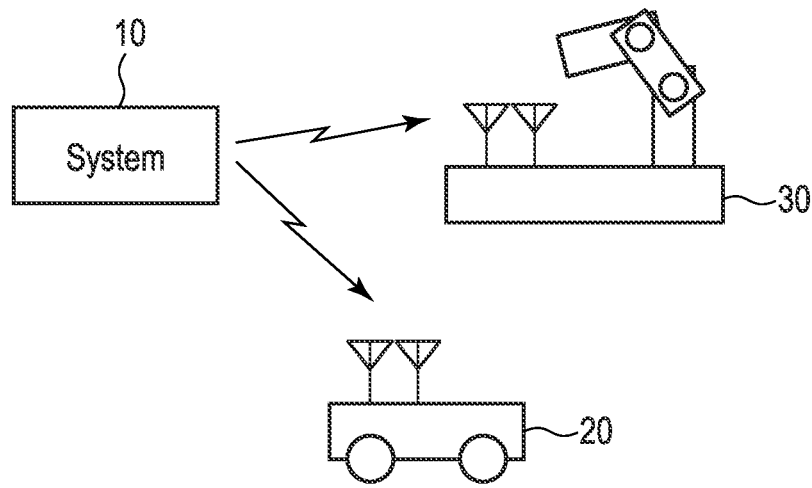
FIG. 1 is an illustration of an outline of the use mode of a system according to a first embodiment.

FIG. 1 shows terminal apparatuses 20 and 30 as a terminal apparatus at least part of which is operated by the system 10.

The terminal apparatus 20 is, for example, a mobile robot such as an automated guided vehicle (AGV). In this case, the above wording "operate at least part of the terminal apparatus" includes operating the terminal apparatus 20 to move the position of the terminal apparatus itself (that is, controlling the movement of the terminal apparatus 20).

The terminal apparatus 30 is an industrial robot having a driving mechanism to move or rotate a part of a robot such as a robot arm. In this case, the above wording "operate at least part of the terminal apparatus" includes operating the terminal apparatus 30 to move or rotate a part (arm portion) of the terminal 30 apparatus (that is, controlling the position of a part of the terminal apparatus 30).

The terminal apparatuses 20 and 30 have been so far described as a mobile robot and an industrial robot. The terminal apparatus in the first embodiment may be any apparatus to be remotely operated, such as a robot for various applications, a transportation device, a machine tool, a security camera, a vehicle having an automatic operating function, an unmanned aircraft, a drone, and a virtual reality (VR) display device, and an augmented reality (AR) display device.

The terminal apparatus in the first embodiment may be an imaging device (camera) or the like for, for example, imaging and monitoring a variety of target objects, in this case, the wording "operate at least part of the terminal apparatus" includes operations of setting a resolution, a frame rate, a shutter speed and a direction in the camera, for example.

The wording "operate at least part of the terminal apparatus" may also include operations of, for example, moving, accelerating and decelerating a vehicle or a cart for loading persons, leads and the like, displaying (turning on and off) the direction indicator of the vehicle or cart, and turning on and off the wiper thereof.

The wording "operate at least part of the terminal apparatus" may include operations of turning on and off, blinking, and displaying a light for transmission of various types of information (alarm, alert, notification of abnormality, notifications of starting, completing and performing a process, etc.).

The "operate at least port of the terminal apparatus" may also include operations of controlling the temperature of a particular part of each of different devices and the temperature of a target object and may include operations of controlling the display of augmented reality (AR) or virtual reality (VR) that is updated in accordance with various environments and user's states.

In the first embodiment, the number of terminal apparatuses (terminal apparatuses at least part, of which is operated by the system 10) may be one or plural.

The case where the system 10 controls (performs an operation for control of) the movement of the terminal apparatus 20 (mobile robot) will be mainly described below. In the following descriptions, the terminal apparatus 20 will be referred to as a target apparatus 20 for the sake of convenience.

In the first embodiment, the system 10 needs to be connected wirelessly to the target apparatus 20, but the system 10 and target apparatus 20 may configure, for example, a third generation partnership project (3GFP) compliant 4G mobile communication system or 5G mobile communication system or configure an IEEE802.11 compliant wireless LAN system. The system 10 and target apparatus 20 may also configure other wireless systems.

Figure 2:
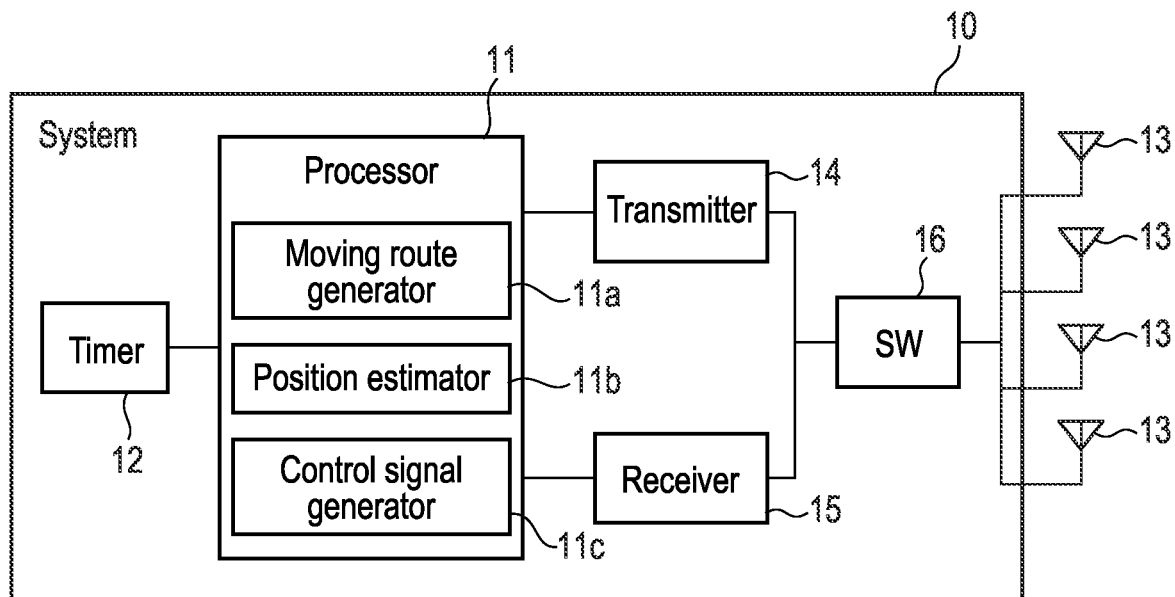
FIG. 2 is a block diagram showing an example of a configuration of the system.

FIG. 2 is a block diagram showing an example of a configuration of the system 10 according to the first embodiment. As shown in FIG. 2, the system 10 includes a processor 11, a timer 12, an antenna 13, a transmitter 14, a receiver 15 and a switch (SW) 16.

Although net explicitly shown in FIG. 2, the system 10 is implemented by a base station and a server apparatus in a wireless system (mobile communication system, wireless LAN system or the like) configured by the system 10 and the terminal apparatus 20. The base station is wirelessly communicable with the terminal apparatus 20, and the server apparatus is connected to the base station by wire (or wirelessly), for example. The system 10 has only to include ore or more base stations and server apparatuses, and may be configured to include, for example, a plurality of base stations and server apparatuses corresponding to the base stations. The server apparatuses in the system 10 include, for example, mobile edge computing (MEC) and the like.

As one example, the processor 11 shown in FIG. 2 is implemented on the server apparatus side, and the timer 12, antenna 13, transmitter 14, receiver 15 and switch (SW) 16 are implemented on the base station side. The timer 12 may be provided on the server apparatus side.

The processor 11 (server apparatus) executes a predetermined program loaded into a main memory from, e.g., a nonvolatile memory (storage device), not shown, to fulfill the functions of a moving route generator 11a, a position estimator 11b and a control signal generator 11c. These units 11a to 11c may be implemented by dedicated hardware or the combination of software and hardware.

When, for example, the target apparatus 20 (mobile robot) moves in a predetermined space (hereinafter referred to as a target space) such as a factory and a warehouse, the moving route generator 11a generates a route along which the target apparatus 20 moves in the target space (hereinafter referred to as a moving route of the target apparatus 20). The moving route of the target apparatus 20 is generated based on a map (data) of the target space and the like. The map of the target space may be prestored in the system 10 or may be obtained from outside the system 10.

The position estimator 11b estimates the position of the target apparatus 20 in the target space (i.e., on the map of the target space).

Figure 3:
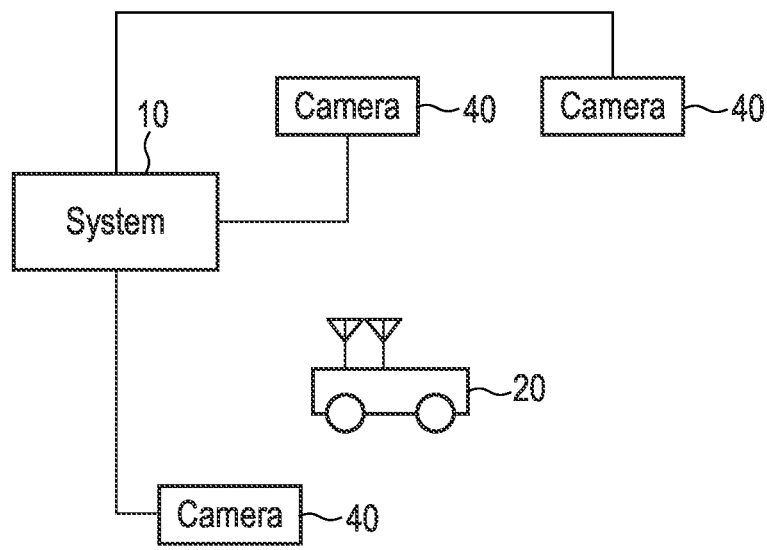
FIG. 3 is a diagram illustrating an example of a process of estimating the position of a target apparatus.

An example of a process of estimating the position of the target apparatus 20 will be described with reference to FIG. 3. Assume here that a plurality of cameras (imaging devices) 40 are disposed in a target space where the target apparatus 20 moves and the system 10 is connected to each of the cameras 40 as shown in FIG. 3. The position estimator 11b can estimate the position of the target apparatus 20 in the target space based on images including the target apparatus 20 which are picked up by the cameras 40.

The case where the position of the target apparatus 20 is estimated using the cameras 40 has been so far described. The position of the target apparatus 20 may be estimated by performing another process.

Figure 4:
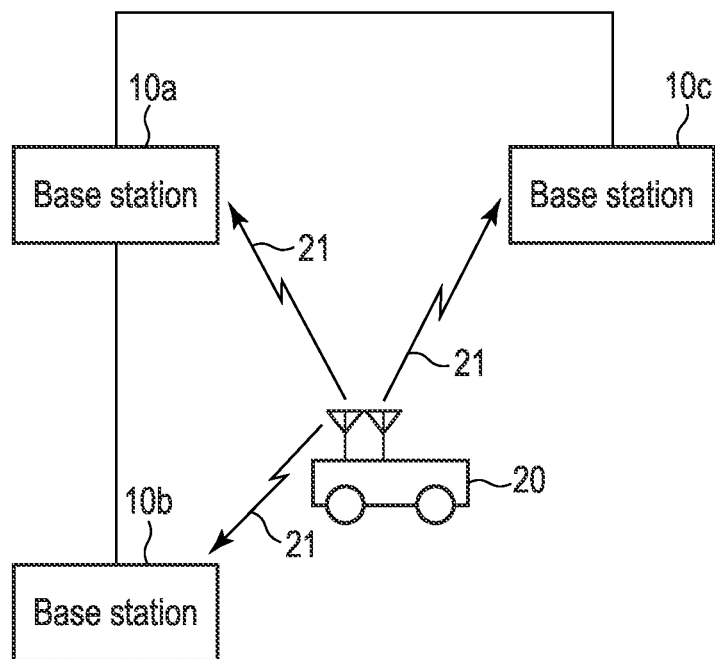
FIG. 4 is a diagram illustrating another example of the process of estimating the position of a target apparatus.

Specifically, it is assumed that a plurality of base stations 10a, 10b and 10c included in the system 10 are synchronized with each other, as shown in FIG. 4, for example. It is also assumed that the system 10 grasps in advance the positions of the base stations 10a, 10b and 10c in the target space.

Assuming here that the target apparatus 20 transmits a reference signal (signal for estimating the position of the target apparatus 20) 21 wirelessly, each of the base stations 10a, 10b and 10c receives the reference signal 21.

The system 10 then acquires time at which the base station 10a has received the reference signal 21 from the target apparatus 20 (hereinafter referred to as reception time of the base station 10a). The system 10 also acquires time at which the base station 10b has received the reference signal 21 from the target apparatus 20 (hereinafter referred to as reception time of the base station 10b). The system 10 also acquires time at which the base station 10c has received the reference signal 21 from the target apparatus 20 (hereinafter referred to as reception time of the base station 10c).

Accordingly, the position estimator 11b can estimate the position of the target, apparatus 10 based on the position of each of the base stations 10a, 10b and 10c and the difference between the reception time of each of the base stations 10a, 10b and 10c.

The position estimator 11b may thus estimate the position of the target apparatus 20 in cooperation with the base stations 10a, 10b and 10c.

Referring back to FIG. 2, the timer 12 measures time and outputs a signal at a preset period, for example. The signal output from the timer 12 is a signal for making a notification of timing with which a control signal is generated and transmitted to the target apparatus 20.

When, for example, the system 10 and the target, apparatus 20 configure a 5G mobile communication system, the period in which the timer 12 outputs a signal (in other words, a control signal is generated and transmitted to the target apparatus 20) can be defined as frame time (frame length) in the 5G mobile communication system. The frame time is, for example, 10 ms. Note that the period in which the timer 12 outputs a signal may be determined in accordance with, for example, the moving speed of the target apparatus 2D. The period in which the timer 12 outputs a signal may be changed dynamically.

The control signal generator 11c generates a control signal to be transmitted to the target apparatus 12, based on the signal output from the timer 20. The control signal is generated based on the moving route generated by the moving route generator 11a and the position of the target apparatus 20 estimated by the position estimator 11b, and includes the moving direction and the moving speed of the target apparatus 20. The moving direction and moving speed of the target, apparatus 20 correspond to an instruction to move the target apparatus 20. In response to the instruction, the target apparatus 20 can move along the moving route generated by the moving route generator 12a. The control signal generated by the control signal generator 11c further includes a validity period of the control signal (instruction to move the target apparatus 20). In the first embodiment, the validity period may be, for example, a period set by the time at which the movement based on the control signal is terminated (the end of the validity period). That is, the control signal includes an instruction to move the target apparatus 20, which is valid for a predetermined period of time.

When the target: apparatus 20 receives the control signal described above, it continues to move based on the moving direction and moving speed included in the control signal until the end of the validity period included in the control signal.

After the target apparatus is moved in response to the control signal (instruction to move the target apparatus 20), the control signal generator 11c further generates a control signal including an instruction indicating a predetermined validity period to move the target apparatus 20 further. That is, the control signal generator 11c repeatedly (e.g., periodically) generates a control signal to move the target apparatus 20.

The antenna 13 is configured by at least one antenna element to perform wireless communication with the target apparatus 20. In FIG. 2, the system 10 includes four antennas 13 in order to improve the reliability of wireless communication with the target apparatus 20, but the number of antennas 13 has only to be one or more.

The transmitter 14 transmits a control signal generated repeatedly by the control signal generator 11c to the target apparatus 20 through the antennas 13. When the target apparatus 20 normally receives the control signal from the transmitter 14, it transmits an acknowledgment, signal indicating that the control signal is normally received. The receiver 15 receives the acknowledgment signal from the target apparatus 20 via the antennas 13.

On the other hand, when the target apparatus 20 does not normally receive the control signal from the transmitter 14, it transmits a non-acknowledgment signal indicating that the control signal is not normally received. The receiver 15 receives the non-acknowledgment signal from the target, apparatus 20.

The switch 16 has a function of selecting a connection destination (transmitter 14 or receiver 15) of the antennas 13 in accordance with the transmission/reception of various signals. When, for example, the antennas 13 are provided separately for transmission and reception, the switch 16 may be omitted.

Figure 5:
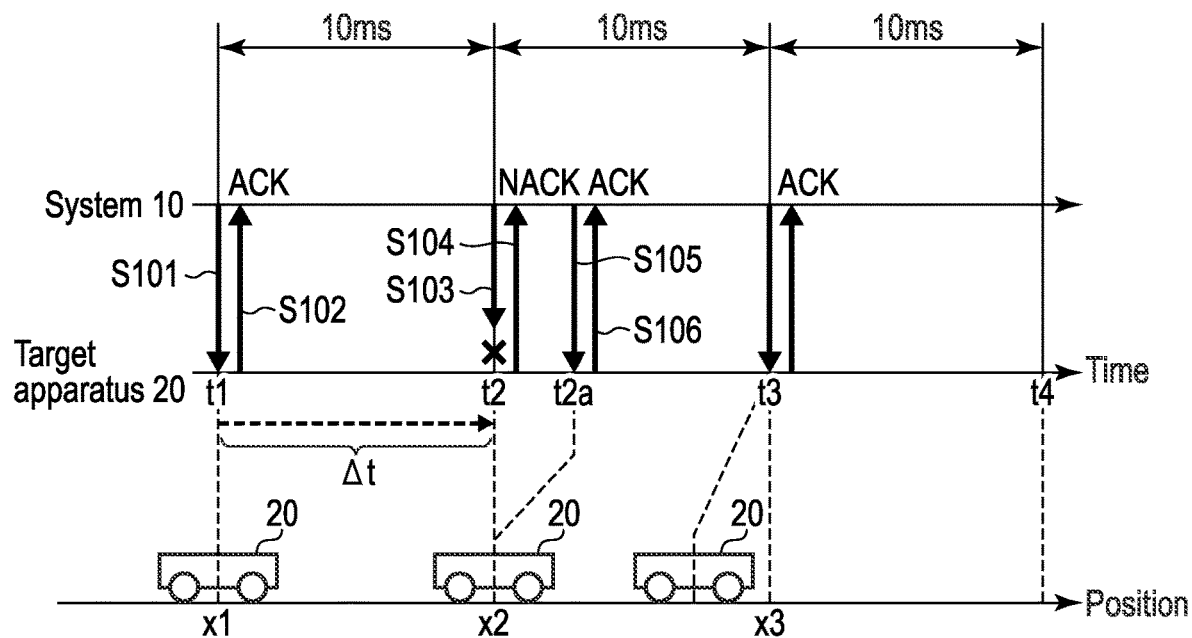
FIG. 5 is a sequence diagram showing an example of the operation of a system according to a comparative example of the first embodiment.

An example of the operation of a system according to a comparative example of the first embodiment will be described with reference to the sequence diagram shown in FIG. 5. In FIG. 5, the system according to the comparative example will be described as a system 10'.

In the comparative example, a period (hereinafter referred to as a control period) in which the system 10' generates a control signal and transmits it to the target apparatus 20 is defined as frame time (10 ms) in the 5G mobile communication system.

First, at time t1 corresponding to the start of the control period, the system 10' transmits a control signal to the target apparatus 20 at position x1 (step S101).

The control signal transmitted in step S101 is generated based on the moving route of the target apparatus 20 and the position (position x1) of the target apparatus 20 at time t1. The control signal includes a moving direction and a moving speed of the target apparatus 20 (instructions to move the target apparatus 20) and a validity period $\Delta t$ of the control signal (instructions). Assume that the validity period $\Delta t$ included in the control signal is 10 ms corresponding to the foregoing control period. In this case, the end of the validity period $\Delta t$ is time t2 obtained by adding validity period $\Delta t$ (10 ms) to time t1.

When the target apparatus 20 receives the control signal transmitted in step S101, it transmits an acknowledgment signal (hereinafter referred to as ACK) indicating that the control signal has been received, to the system 10' (step S102). The ACK transmitted in step S102 is received by the system 10'. The system 10' can thus grasp that the control signal transmitted in step S101 is received by the target apparatus 20.

When the control signal transmitted in step S101 is received by the target apparatus 20 as described above, the target apparatus 20 moves toward the moving direction included in the control signal at the moving speed included in the control signal. This movement continues until time t2 corresponding to the end of the validity period Δt included in the control signal. Assume here that the target apparatus 20 continues to move until time t2 and thus reaches position x2.

At time t2 corresponding to the start of the next control period, a control signal subsequent to the control signal transmitted in step S101 is transmitted from the system 10' to the target apparatus 20 (step S103). When the target, apparatus 20 receives the control signal transmitted in step S103 (in other words, the target apparatus 20 succeeds in receiving the control signal), the target apparatus 20 can transmit an ACK to the system 10' and continue moving based on the control signal (moving direction, moving speed, and validity period).

On the other hand, it is assumed that the target apparatus 20 does not receive the control signal transmitted in step S103 (in other words, the target apparatus 20 fails to receive the control signal) depending on the environment around the system 10' or the target apparatus 20, as shown in FIG. 5. In this case, the target apparatus 20 transmits a non-acknowledgment signal (hereinafter referred to as a NACK) indicating that the control signal is not received, to the system 10' (step S104).

Note that, the timing at which the system 10' transmits a control signal to the target apparatus 20, is also grasped by the target apparatus 20 by the allocation of wireless resources (slots) in the 5G mobile communication system. The target apparatus 20 can thus operate to transmit a NACK to the system 10' when the target apparatus 20 does not receive a control signal at the titling (time t2) when the system 10' transmits the control signal.

Since the validity period Δt included in the control signal transmitted in step S101 is 10 ms corresponding to the control period, it ends at time t2. If, therefore, the target apparatus 20 does not receive a control signal subsequent to the control signal transmitted in step S101 at time t2, it cannot continue moving but stops at position x2.

The system 10' receives the NACK transmitted in step S104. When the system 10' receives the NACK, it retransmits the control signal transmitted in step S103 at time t2a (step S105).

When the target apparatus 20 receives the control signal retransmitted in step S105, in transmits an ACK to the system 10' (step S106).

When the target apparatus 20 receives the control signal retransmitted in step S105 as described above, it moves toward the moving direction included in the control signal at the moving speed included in the control signal (the target apparatus 20 restarts to move).

If the target apparatus 20 receives the control signal at time t2, it can continue moving from time t2 to time t3 corresponding to the start of the next control period (time t3 when the next control signal is transmitted). The target apparatus 20 can thus reach the position x3 at time t3.

On the other hand, if the target apparatus 20 does not receive the control signal at time t2 as described above, it stops from time t2 to time t2a. Even though the target apparatus 20 receives the control signal retransmitted at time t2a, it cannot reach the position x3 at time t3.

According to the operation of the system 10' shown in FIG. 5, when the target apparatus 20 does net receive a control signal, for example, at time t2, it cannot be operated efficiently (the moving efficiency of the target apparatus 20 decreases).

An example of the operation of the system 10 according to the first embodiment will be described with reference to the sequence diagram shown in FIG. 6. In this example, the same operations as those of the system 10' according to the comparative example of the first embodiment shown in FIG. 5 will not be described in detail, but the operations other than those in FIG. 5 will mainly be described.

First, at time t1 corresponding to the start of the control period, the system 10 transmits a control signal to the target apparatus 20 at position x1 (step S111). The control signal transmitted in step S111 is generated based on the moving route of the target apparatus 20 (generated by the moving route generator 11a) and the position of the target apparatus 20 (estimated by the position estimator 11b) at time t1 as described above. The control signal includes a moving direction and a moving speed of the target apparatus 20 and a validity period of the control signal.

As described above, the system 10 includes a base station and a server apparatus, and the control signal is generated by the server apparatus (control, signal generator 11c). The server apparatus transmits the control signal to the base station in order to transmit the control signal to the target apparatus 20. Accordingly, the control signal is transmitted from the base station to the target apparatus 20.

The moving direction and moving speed included in the control signal transmitted in step S111 are the same as those included in the control signal transmitted in step S101 shown in FIG. 5. However, the validity period included in the control signal transmitted in step S111 differs from that included in the control signal transmitted in step S101.

Specifically, the control signal transmitted in step S101 includes the validity period Δt, but it is assumed that the control signal transmitted in step S111 includes a validity period (validity period Δt+α) obtained by adding a to the period Δt.

In the first embodiment, the period Δt is 10 ms corresponding to the control period as described above, and the value of a added to the period Δt is set (selected) baaed on, for example, the moving route and position of the target apparatus 20. Specifically, the value of α is set in such a range that the position of the target apparatus 20 does not deviate from the moving route at time t2b (time obtained by adding validity period Δt+α to time t1) which corresponds to the end of validity period Δt+α when the target apparatus 20 moves in the moving direction included in the control signal transmitted in step S111 at the moving speed included therein.

If, for example, a large value is set as α, the target apparatus 20 is highly likely to contact other terminal apparatuses moving in the target space together with the target, apparatus 20 and workers and the like placed in the target space. For this reason, α may be set based on the moving routes and positions of the other terminal apparatuses, the positions of the workers placed in the target, space, and the like.

When the target apparatus 20 receives the control signal transmitted in step S111, the process of step S112 corresponding to step S102 shown in FIG. 5 is performed.

When the target apparatus 20 receives the control signal transmitted in step S111 as described above, it moves toward the moving direction included in the control signal at the moving speed included in the control signal. It is assumed that as a result of the movement of the target apparatus 20 until time t2 as described above, the target apparatus 20 has reached the position x2.

At time t2 corresponding to the start of the next control period, the system 10 transmits a control signal subsequent to the control signal transmitted in step S111 to the target, apparatus 20 (step S113). As in the control signal transmitted in step S111, in the control signal transmitted in step S113, the validity period Δt+α is also set.

Figure 6:
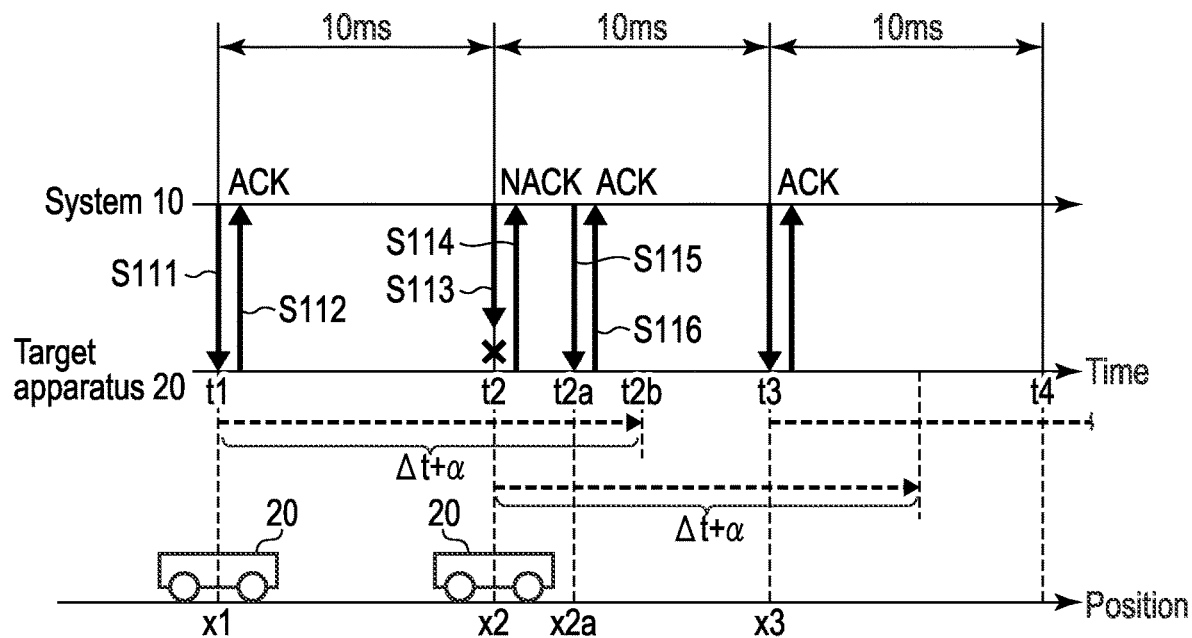
FIG. 6 is a sequence diagram showing an example of the operation of the system according to the first embodiment.

When the target apparatus 20 does not receive the control signal transmitted in step S113 as shown in FIG. 6, the process of step S114 corresponding to step S104 shown in FIG. 5 is performed.

Since the validity period Δt+α included in the control signal transmitted in step S111 is longer than the control period (10 ms), time t2b corresponding to the end of the validity period Δt+α is later than time t2 when the control signal is transmitted in step S113. In the first embodiment, therefore, even though the target apparatus 20 does not receive the control signal transmitted in step S113, it can continue moving based on (the moving direction and moving speed included in) the control signal transmitted in step S111.

When the process of step S114 is performed, the processes of steps S115 and S116 corresponding to those of steps S105 and S106 shown in FIG. 5 are performed.

When the control signal is retransmitted in step S115, the target apparatus 20 is moving based on the control signal transmitted in step S111. When the target apparatus 20 receives the control signal retransmitted in step S115, the target apparatus 20 may update the control signal transmitted in step S111 to the control signal retransmitted in step S115 and move based on the updated control signal. Assume in this case that the time corresponding to the end of the validity period Δt+α included in the control signal retransmitted in step S115 is time obtained by adding the validity period Δ+α to time t2.

Although not described in detail, when the process of step S116 is performed, the system 10 transmits a control signal subsequent to the control signal (control signal retransmitted at time t2a), which is transmitted at time t2, to the target apparatus 20 at time t3, and continues the operation described with reference to FIG. 6.

According to the operation of the system 10 shown in FIG. 6, the validity period Δt+α (which is longer than the control period) is set in the control signal transmitted at the time t1. Thus, even though the target apparatus 20 does not receive the control signal at time t2, for example, it can continue moving until time t2a at which the control signal is retransmitted.

In the comparative example shown in FIG. 5, the target apparatus 20 stops from time t2 to time t2a, whereas in the first embodiment, the target, apparatus 20 can continue moving from time t2 to time t2a. The target apparatus 20 can thus reach the position x2a at time t2a and then the position x3 at time t3.

As described above, in the first embodiment, a first control signal including a first instruction is generated to move (operate) the target apparatus 20 within a first validity period, and the generated first control signal is transmitted to the target apparatus 20 wirelessly at a first timing (time t1). Furthermore, in the first embodiment, when the target apparatus 20 is moved by the first instruction, a second control signal including a second instruction is generated to move (operate) the target apparatus 20 within a second validity period, and the generated second control signal is transmitted to the target apparatus 20 wirelessly at a second timing (time t2). In this case, the end of a first validity period is later than the second timing at which the second control signal is transmitted from the system 10 to the target apparatus 20.

In the first embodiment, the validity period included in a control signal is set longer than the time at which its subsequent control signal is transmitted as described above. Even though the target apparatus 20 does not receive the control signal at that time, it can continue moving based on a control signal that has already been received before the control signal is received.

Therefore, in the first embodiment, the target apparatus 20 can be operated efficiently (to prevent the moving efficiency from decreasing).

In the first embodiment, the validity period Δt+α included in the control signal is set based on the moving route and position of the target apparatus 20. The following are descriptions of first to third modifications to the first embodiment regarding the setting of the validity period Δt+α.

An example of the operation of a system 10 according to a first modification to the first embodiment will be described with reference to the sequence diagram shown in FIG. 7.

First, as in FIG. 6, the system 10 transmits a control signal to the target apparatus 20 at position x1 at time t1 (step S121). The control signal transmitted in step S121 includes a moving direction and a moving speed of the target apparatus 20 and a validity period of the control signal as described above.

As described above, when the target apparatus 20 does not receive the control signal, the system 10 retransmits the control signal to the target apparatus 20 during a control period. In other words, when the target apparatus 20 does not receive the control signal transmitted, for example, at the start of the control period, the system 10 retransmits the control signal by the end of the control period unless the target apparatus 20 receives the control signal.

More specifically, the start time of a control period subsequent to the control period whose start time is t1 at which the control signal is transmitted in step S121, is time t2. When the target apparatus 20 does not receive a control signal transmitted at time t2, the system 10 retransmits the control signal by time t3 (during a period of 10 ms corresponding to the control period). It can be considered that the target apparatus 20 is likely to receive the control signal transmitted at time t2 at least by time t3.

Assume in the first modification to the first embodiment that a in the validity period Δt+α included in the control signal transmitted in step S121 is set as a period (control period) Δt during which the control signal is retransmitted. In other words, the validity period Δt+α in the first modification to the first embodiment corresponds to the validity period Δt×2.

The time at which the validity period Δt+α included in the control signal transmitted in step S121 ends is the same as time t3 (fourth timing) at which a control signal (third control signal) subsequent to a control signal (second control signal) subsequent to the control signal (first control signal) is transmitted.

When the process of step S121 is performed, the processes of steps S122 to S126 corresponding to steps S112 to S116 shown in FIG. 6 are performed.

For the control signal transmitted in step S123, a validity period Δt+α (Δt×2) similar to that for the control signal transmitted in step S121 is set. The same applies to other control signals.

According to the first modification to the first embodiment, a time period that is twice the control period is set as a validity period. Even though the target apparatus 20 fails to receive the control signal, for example, at time t2, it can continue moving until the system 10 succeeds in retransmitting the control signal (until time t3). The target apparatus 20 can thus be prevented from decreasing in its moving efficiency.

Figure 7:
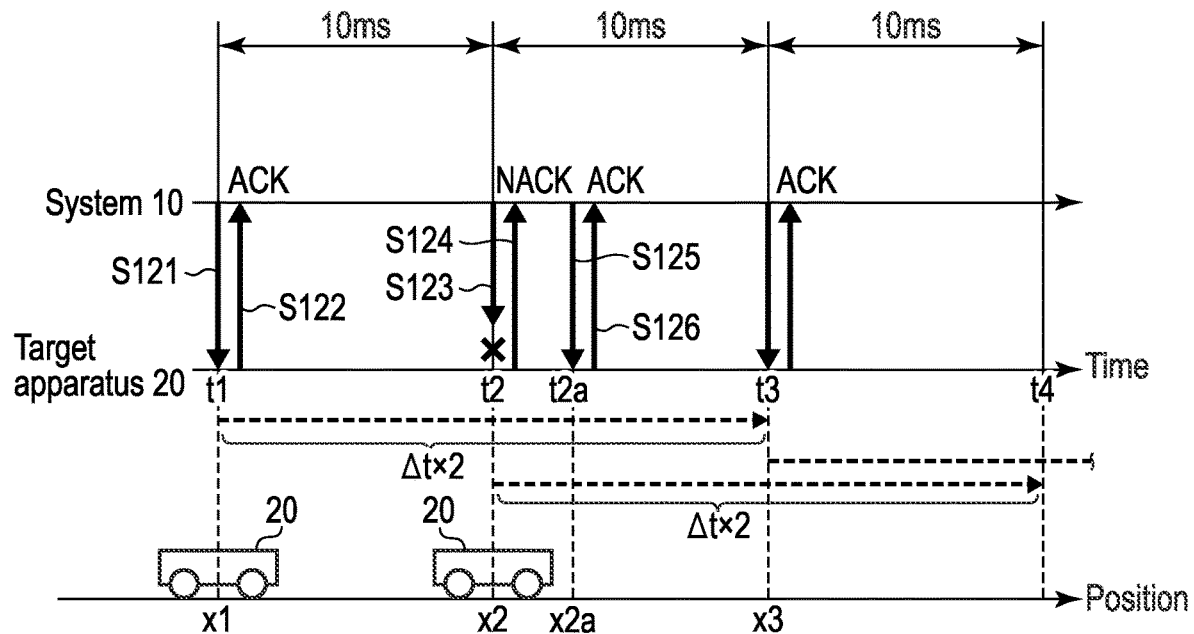
FIG. 7 is a sequence diagram showing an example of the operation of a system according to a first modification to the first embodiment.

In the example of FIG. 7, the time corresponding to the end of the validity period $\Delta t+\alpha$ ($\Delta t \times 2$) included in the control signal transmitted at time t1 is the same as time t3 (a third timing at which the third control signal is transmitted to the target apparatus 20). The time corresponding to the end of the validity period $\Delta t+\alpha$ may be earlier than that time t3.

An example of the operation of the system 10 according to a second modification to the first embodiment will be described with reference to the sequence diagram shown in FIG. 8.

First, as in FIG. 6, the system 10 transmits a control signal to the target apparatus 20 at position x1 at time t1 (step S131). The control signal transmitted in step S121 includes a moving direction and a moving speed of the target apparatus 20 and a validity period of the control signal as described above.

When wireless communication is performed between the system 10 and the target apparatus 20, the system 10 determines a slot indicating a time period in which the system 10 can transmit a control signal to the target apparatus 20 (the system 10 allocates the target apparatus 20 a slot in which the target apparatus 20 receives a control signal), and notifies the target, apparatus 20 of the slot in advance. One slot or a plurality slots nay be allocated to the target apparatus 20 within one control period, for example. The number of slots allocated to the target apparatus 20 varies according to, for example, whether the system 10 needs to perform wireless communication with a target apparatus (or target apparatuses) other than the target apparatus 20.

Assuming that the target apparatus 20 does net receive the control signal transmitted at time t2 (in other words, the system 10 fails to transmit the control signal), the control signal is retransmitted at least by the end of the time period indicated by the last one of the slots allocated to the target apparatus 20 (referred to as the last slot of the target apparatus 20 hereinafter) within the control period from time t2 to time t3.

In the second modification to the first embodiment, therefore, the time corresponding to the end of the validity period $\Delta t+\alpha$ included in the control signal is defined as time corresponding to the end of the time period indicated by the last slot of the target apparatus 20 (time corresponding to the end of the period in which the control signal is retransmitted based on the slot allocated to the target apparatus 20).

The time corresponding to the end of the validity period $\Delta t+\alpha$ included in the control signal transmitted in step S131 is the same as the time (fourth timing) corresponding to the end of the time period indicated by the last slot of the target apparatus 20 allocated within the control period between time t2 and time t3.

FIG. 6 shows a specific example in which slots 201 and 202 are allocated to the target, apparatus 20 between time t2 and time t3. The validity period $\Delta t+\alpha$ ($\alpha$ of the validity period) included in the control signal transmitted at time t1 is set such that the time corresponding to the end of the validity period is the same as time t2c corresponding to the end of the time period indicated by the slot 202.

When the process of step S131 is performed, the processes of steps S132 to S136 corresponding to steps S112 to S116 shown in FIG. 6 are performed.

In step S135, the control signal is retransmitted in the time period indicated by the slot (e.g., slot 202) allocated to the target apparatus 20.

For the control signal transmitted in step S133 (the control signal retransmitted in step S135), a validity period $\Delta t+\alpha$ similar to that for the control signal transmitted in step S131 is set.

Assuming that slots 203 and 204 are allocated to the target apparatus 20 from time t3 to time t4 at which a control signal subsequent to the control signal transmitted at time t3 is transmitted, the validity period $\Delta t+\alpha$ ($\alpha$ of the validity period) included in the control signal transmitted in step S133 is set such that the time corresponding to the end of the validity period is the same as the time corresponding to the end of the time period indicated by the slot 204.

The control signal transmitted in step S133 has been so far described. The same applies to other control signals transmitted after time t3.

According to the second modification to the first embodiment described above, the validity period is sot such that the time corresponding to the end of the last slot of the target apparatus 20 within a control period subsequent to the control period in which the control signal is transmitted is the time corresponding to the end of the validity period included in the control signal. Even though the target apparatus 20 fails to receive the control signal at, for example, time t2, it can continue moving until the system 10 succeeds in retransmitting the control signal (until the end of the time period indicated by the last slot of the target apparatus 20). The target apparatus 20 can thus be prevented from decreasing in its moving efficiency.

Assume in the second modification to the first embodiment that the slots at least in the subsequent control period (the period from time t2 to time t3) have been completely allocated when a control signal to be transmitted at, for example, time t1 is generated. Specifically, in the second modification to the first embodiment, for example, similar slot allocation can be adopted in each control period (in other words, slots in each control period are allocated in advance) unless the number of terminal apparatuses controlled by the system 10 is changed. If the number of terminal apparatuses controlled by the system 10 is changed, the slot allocation nay be performed again (changed).

Figure 8:
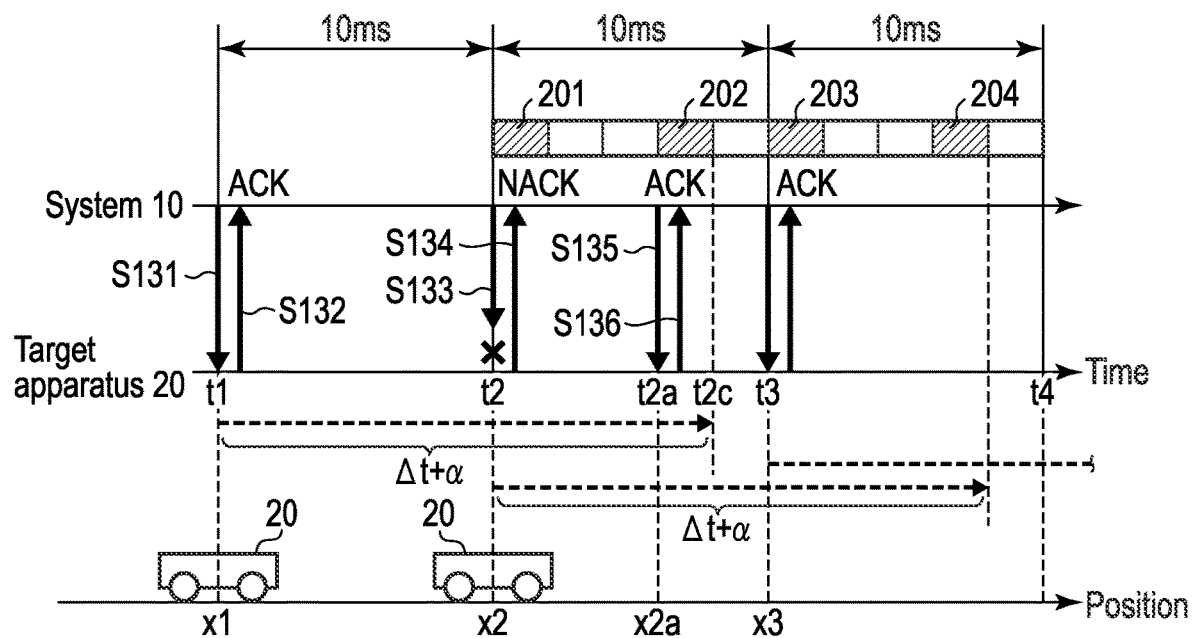
FIG. 8 is a sequence diagram shewing an example of the operation of a system according to a second modification to the first embodiment.

In the example shown in FIG. 8, the time corresponding to the end of the validity period $\Delta t+\alpha$ included in the control signal transmitted at time t1 is the same as time t2c corresponding to the end of the time period indicated by the last slot of the target apparatus 20 between time t2 and time t3. The time corresponding to the end of the validity period $\Delta t+\alpha$ may be earlier than time t2c.

An example of the operation of the system 10 according to a third modification to the first embodiment will be described with reference to the sequence diagram shown in FIG. 2.

First, as in FIG. 6, the system 10 transmits a control signal to the target apparatus 20 at position x1 at time t1 (step S141). The control signal transmitted in step S141 includes a moving direction and a moving speed of the target apparatus 20 and a validity period of the control signal as described above.

In the third modification to the first embodiment, $\alpha$ in the validity period $\Delta t+\alpha$ included in the control signal is defined as an average value of time (referred to as average retransmission time hereinafter) required until the control signal is retransmitted (until the target apparatus 20 succeeds in receiving the control signal). The time corresponding to the end of the validity period $\Delta t + \alpha$ included in the control signal is the same as time t2d (fifth timing) obtained by adding the average retransmission time to time t2 at which a control signal (second control signal) subsequent to the control signal is transmitted.

The average retransmission time may be calculated in advance from, for example, the statistics of the time from the failure of reception of the control signal to the success of retransmission thereof (the time from the reception of a NACK to that of an ACK). The average retransmission time may be updated periodically or nay be recalculated when, for example, the environment in which the system 10 and the target apparatus 20 are placed is changed.

When the process of step S141 is performed, the processes of steps S142 to S146 corresponding to steps S112 to S116 shown in FIG. 6 are performed.

For the control signal transmitted in step S143, a validity period $\Delta t + \alpha$ ($\Delta t$+average retransmission time) similar to that for the control signal transmitted in step S141 is set. The same applies to other control signals.

According to the third modification to the first embodiment, a time period obtained by adding the average retransmission time to the control period is set as a validity period. Even though the target apparatus 20 fails to receive the control signal, for example, at time t2, it can continue moving until the system 10 succeeds in retransmitting the control signal. The target apparatus 20 can thus be prevented from decreasing in its moving efficiency.

Figure 9:
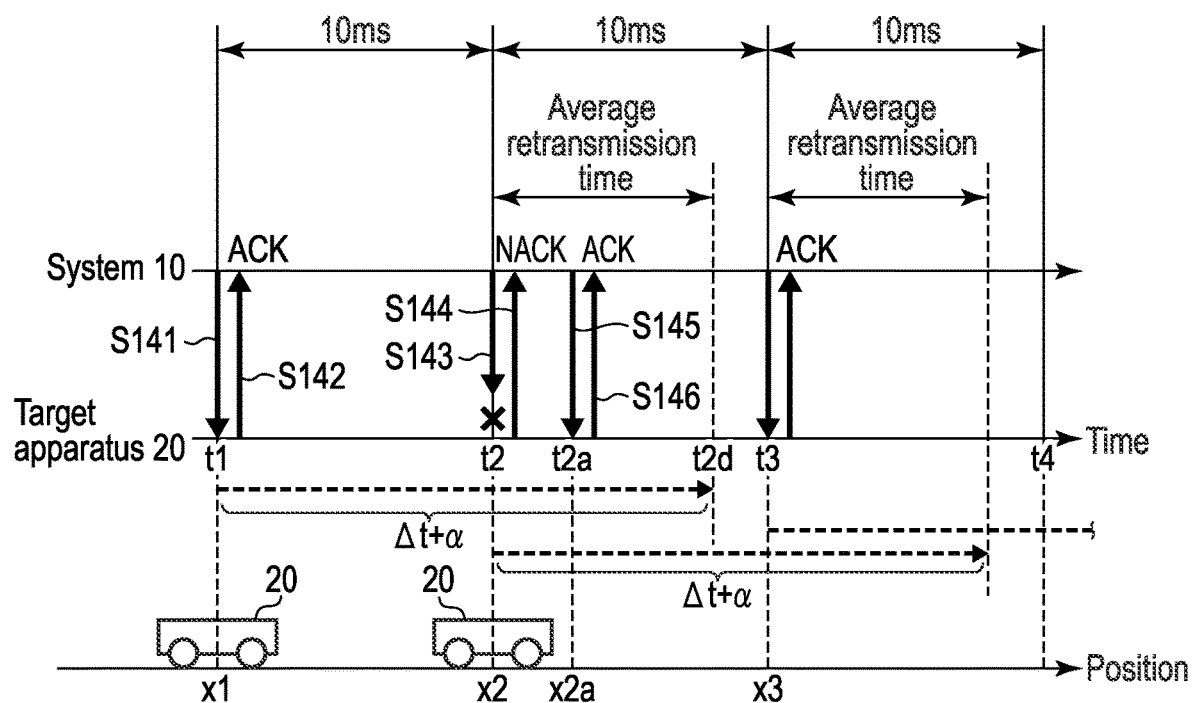
FIG. 9 is a sequence diagram showing an example of the operation of a system according to a third modification to the first embodiment.

In the example shown in FIG. 9, the time corresponding to the end of the validity period $\Delta t + \alpha$ included in the control signal transmitted at time t1 is the same as time t2d obtained by adding the average retransmission time to time t2. The time corresponding to the end of the validity period $\Delta t + \alpha$ may be earlier than time t2a.

The first to third modifications to the first embodiment have been described so far. In the first embodiment, the validity period included in the control signal may be set from another viewpoint if the next control signal is retransmitted by the end of the validity period.

It is assumed in the first embodiment that when the target apparatus 20 does not receive a control signal, the system 10 retransmits the same control signal. The control signal to be retransmitted may be newly generated based on the position of the target apparatus 20 at the time of retransmission (in other words, the moving direction and moving speed of the target apparatus 20 may be changed at the time of retransmission).

The first embodiment is mainly directed to a case where the system 10 controls the movement of the target apparatus 20 (mobile robot). The first embodiment is applicable if at least part of the terminal apparatus is operated (controlled) as described above. The some applies to the following embodiments.

Second Embodiment

Next is a description of a second embodiment. The outline of the use mode of a system according to the second embodiment is similar to that in the foregoing first embodiment, as is the configuration of the system. The outline and the configuration will be described 53 appropriate with reference to FIGS. 1 and 2, for example.

The foregoing first embodiment is described based on the fact that when the target apparatus 20 does not receive a control signal from the system 10, the system 10 retransmits the control signal. The second embodiment differs from the first embodiment in the method of retransmitting the control signal.

An example of the operation of a system 10 according to the second embodiment will be described below with reference to the sequence diagram shown in FIG. 10.

First, the processes of steps S151 to S154 corresponding to steps S111 to S114 shown in FIG. 6 are performed.

In step S154, the system 10 receives a NACK from the target: apparatus 20. Upon receiving the NACK, the system 10 retransmits the control signal, which is transmitted in step S103, to the target apparatus 20 at, for example, time t2a (Step S155).

The target apparatus 20 does not receive the control signal transmitted in step S153 (in other words, the system 10 fails to transmit the control signal). If the system 10 retransmits the control signal in the same manner, it is likely to fail to retransmit it.

Assume that in step S155 the system 10 retransmits the control signal by a method that differs from that for retransmitting the control signal in step S153. First to fifth methods will be described below as methods for retransmitting a control signal (control signal retransmission method) in the second embodiment.

The first method includes retransmitting the control signal using a resource block (frequency band, etc.) which differs from that for the control signal transmitted in step S153. In other words, the first method includes changing the resource block used when the control signal is transmitted in step S153 and retransmitting the control signal. According to the first method, when the reception level of the resource block used to transmit the control signal in step S153 is lowered due to, for example, multipass phasing, it is expected that the success rate of retransmission is improved by retransmitting the control signal using another resource block whose reception level is not lowered.

In addition, when, for example, the system 10 and the target apparatus 20 configure a 5G mobile communication system, a network slice technology may be applied to wireless communications between the system 10 and the target apparatus 20. The network slice technology is a technology capable of setting a plurality of logical sections (network slices) on a common resource placed in a network and operating the network slices independently. In this case, the second method includes retransmitting the control signal using a network slice other than that for the control signal transmitted in step S153. In other words, the second method includes changing the network slice used to transmit the control signal and retransmitting the control signal. According to the second method, it is expected that the success rate of retransmission is improved, for example, by using a network slice having higher priority (network slice capable of transmitting a control signal preferentially) than the network slice used to transmit the control signal in step S153.

The third method includes retransmitting the control signal by a modulation scheme other than that for the control signal transmitted in step S153. In other words, the third method includes changing the modulation scheme used to transmit the control signal in step S153 and retransmitting the control signal. According to the third method, it is expected that the success race of retransmission is improved, for example, by retransmitting a control signal modulated by a modulation scheme whose transmission rate is lower than that of the modulation scheme in which the control signal transmitted in step S153 is modulated. Note that the modulation scheme in the second embodiment includes a modulation and coding scheme (MCS) and the like.

The fourth method includes retransmitting the control signal with transmission power other than that for the control signal transmitted in step S153. In other words, the fourth method includes changing the transmission power to transmit the control signal in step S153 and retransmitting the control signal. According to the fourth method, it is expected that the success rate of retransmission is improved, for example, by retransmitting the control signal with transmission power that is larger than the transmission power to transmit the control signal in step S153.

As described above with reference to FIG. 2, it is assumed that the system 10 includes a plurality of antennas 13. If the system 10 (transmitter 14) includes a plurality of antennas 13, it can transmit a control signal, which is formed on a beam by the beam forming (BF) technique, to the target apparatus 20. The directivity (phase and amplitude) of the control signal in this case is changed by a parameter called a weight. The fifth method includes retransmitting the control signal using a weight of beamforming (hereinafter referred to as BF weight) other than the control signal transmitted in step S153. In other words, the fifth method includes changing the RF weight (transmission pattern of the antennas 13) used to transmit the control signal in step 153 and retransmitting the control signal. The BF weight to retransmit the control signal may be determined based on, for example, the position of the target apparatus 20 which is estimated by the position estimator 11b. According to the fifth method, when it is estimated that a sufficient reception level cannot be obtained at the position of the target apparatus 20 with the BF weight to transmit the control signal in step S153, the BF weight is changed to retransmit the control signal. It is thus expected that the success rate of retransmission is improved by increasing the reception level of the target apparatus 20.

In step S155, the control signal may be retransmitted using at least one of the first to fifth methods (by changing at least one of the resource block, network slice, modulation scheme, transmission power, and transmission pattern of the antennas 13, which are used in transmitting the control signal).

When the process of step S155 is performed, the process of step S156 corresponding to step S116 shown in FIG. 6 is performed.

Figure 10:
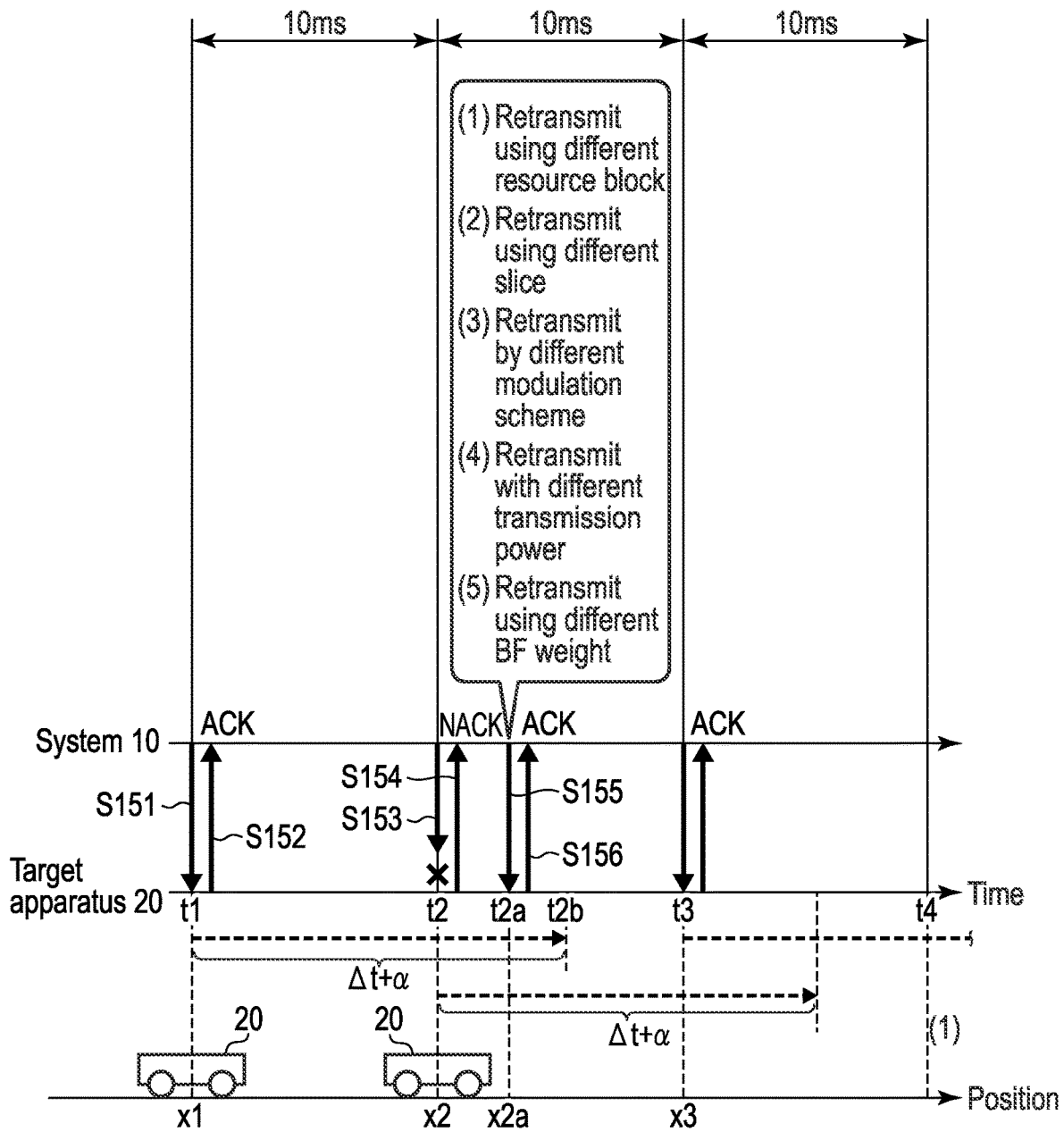
FIG. 10 is a sequence diagram showing an example of the operation of a system according to a second embodiment.

With reference to FIG. 10, the transmission of the control signal transmitted in step S53 has been described. For example, even though the target apparatus 20 does not receive the control signal transmitted in step S151, the control signal may be retransmitted using at least one of the first to fifth methods. The same applies to a case where the target apparatus 20 does not receive any other control signal.

The retransmission of the control signal using at least one of the first to fifth methods has been so far described. The control signal may be retransmitted by combining two or more of the first to fifth methods.

As described above, in the second embodiment, the control signal is retransmitted by changing at least one of the resource block, network slice, modulation method, transmission power, and transmission pattern of the antennas 13, which are used in transmitting the control signal (using radio parameters other than those used in transmitting the control signal that was not received by the target apparatus 20). Thus, the success race of retransmission (transmission) of the control signal cart be improved.

In the second embodiment described above, the control signal is retransmitted mainly by the first to fifth methods, but it may be retransmitted by a method other than the first, to fifth methods. That is, in the second embodiment, the control, signal has only to be retransmitted by a method (radio parameter) other than that for the control signal not received by the target apparatus 20.

Furthermore, in the second embodiment described above, a control signal is retransmitted (transmitted from the system 10 directly to the target apparatus 20, but it may be retransmitted through a route other than that in the second embodiment.

Below is a description of a modification to the second embodiment regarding a configuration for retransmitting a control signal through a route different from that of the present embodiment will be described. The modification to the second embodiment includes first and second modifications, which will be described below.

An example, of the operation of a system 10 according to the first modification to the second embodiment will be described with reference to the sequence diagram shown in FIG. 11. Assume in this first modification that the system 10 is configured to further control the movement (position) of another terminal apparatus 20a in addition to the target apparatus 20. The terminal apparatus 20a may be of a different type from the target apparatus 20 such as the terminal apparatus shown in FIG. 2 or may be similar to the target apparatus 20. The target (terminal) apparatus 20a may not be controlled by the system 10.

First, the processes of steps S161 to S164 corresponding to steps S151 to S154 shown in FIG. 10 are performed.

When the process of step S164 is performed, the system 10 retransmits the control signal, which is transmitted in step S163 (the control signal not received by the target apparatus 20), to the target apparatus 20. The control signal is retransmitted to the target apparatus 20 through the terminal apparatus 20a described above.

Specifically, the system 10 transmits the control signal transmitted in step S163, to the terminal apparatus 20a (step S165). In this case, the system 10 instructs the terminal apparatus 20a to transmit (transfer) the control signal transmitted in step S165, to the target apparatus 20.

As described above, the control signal transmitted in step S165 is received by the terminal apparatus 20a and transmitted to the target, apparatus 20 at time t2a in response to the instruction from the system 20 (step S166).

Upon receiving the control signal transmitted in step S166, the target apparatus 20 transmits an ACK to the terminal apparatus 20a (step S167).

Upon receiving the ACK in step S167, the terminal apparatus 20a transmits the ACK to the system 10 (step S168).

In the first modification to the second embodiment, the control signal is retransmitted to the target apparatus 20 via the terminal apparatus 20a other than the target apparatus 20 (using another terminal apparatus as a relay). With this configuration, the control signal is retransmitted through a wireless route other than that for the control signal not received by the target apparatus 20. The success rate of retransmission (transmission) of the control signal can thus be improved.

An example of the operation of a system 10 according to the second modification to the second embodiment will be described with reference to the sequence diagram shown in FIG. 12. Assume in this second modification that the system 10 includes base stations 10a and 10b.

First, the processes of steps S171 to S174 corresponding to steps S151 to S154 shown in FIG. 10 are performed.

Figure 12:
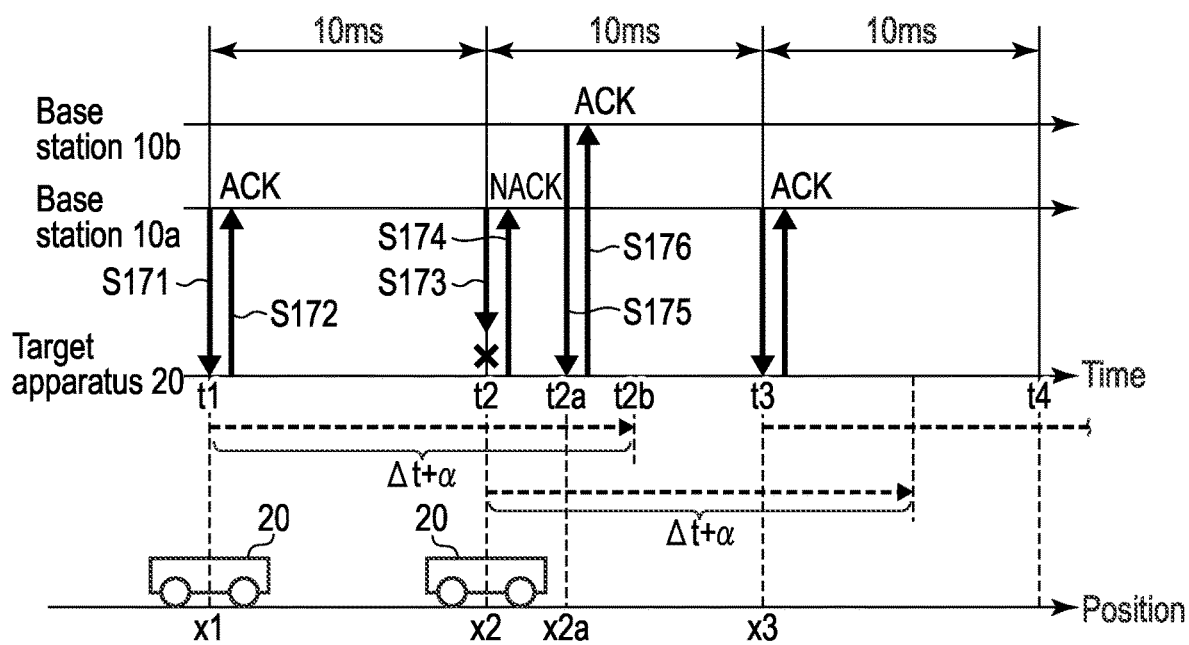
FIG. 12 is a sequence diagram showing an example of the operation of a system according to a second modification to the second embodiment.

Assume that the base station 10*a* transmits a control signal in steps S171 and S173 as shown in FIG. 12.

When the process of step S174 is performed, the control signal transmitted in step S173 (the control signal not received by the target apparatus 20) is retransmitted to the target apparatus 20. This control signal is retransmitted to the target apparatus 20 from the base station 10*b* other than the base station 10*a*.

Specifically, in order to transmit the control signal transmitted in step S173 to the target apparatus 20, the server apparatus included in the system 10 transmits the control signal to the base station 10*b*. Although net shown in FIG. 12, it is assumed that the server apparatus and the base station 10*b* are connected by wire, for example, and the server apparatus transmits a control signal generated in the server apparatus (control signal generator 11*c*) to the base station 10*b* via wired connection.

Upon receiving a control signal from the server apparatus as described above, the base station 10*b* transmits the control signal to the target apparatus 20 at time t2*a* (step S175). In step S175, the control signal is wirelessly transmitted from the base station 10*b* to the target apparatus 20.

Upon receiving the control signal in step S170, the target apparatus 20 transmits an ACK to the base station 10*b* (step S176).

Upon receiving the ACK in step S176, the base station 10*b* transmits the ACK to the server apparatus. The ACK in this case is transmitted from the base station 10*b* to the server apparatus via wired connection described above.

In the second modification to the second embodiment, the control signal is retransmitted to the target apparatus 20 from the base station 10*b* other than the base station 10*a*. With this configuration, the control signal is retransmitted through a wireless route other than that for the control signal not received by the target apparatus 20. The success rate of retransmission (transmission) of the control signal can thus be improved.

As described above, the control signal is retransmitted to the terminal apparatus 20 through the other terminal apparatus 20*a* in the first modification to the second embodiment, and the control signal is retransmitted from the base station 10*b* in the second modification thereto. These modifications will be satisfied if the control signal is not directly transmitted to the target apparatus 20 from the base station 10*a*. Thus, the control signal may be retransmitted through a device other than the terminal apparatus 20*a* or the base station 10*b*.

In the first modification to the second embodiment, when the control signal is transmitted from the system 10 (base station 10*a*) to the other terminal apparatus 20*a* or when the control signal is transmitted from the terminal apparatus 20*a* to the target apparatus 20, at least one of the first to fifth methods described in the second embodiment may be used (at least one of the resource block, network slice, modulation scheme, transmission power, and transmission pattern of the antennas 13 may be changed). The same applies to the second modification to the second embodiment in which the control signal is transmitted from the base station 10*b* to the target apparatus 20.

In the second embodiment (and its first and second modifications), the configurations other than those of the first embodiment have been mainly described. The foregoing configurations of the second embodiment can be combined with those of the first embodiment (and its first to third modifications) as appropriate. Specifically, the control signal is shown as including the validity period $\Delta t+\alpha$ In FIGS. 10 to 12. The validity period $\Delta t+\alpha$ may be set as described in the first embodiment or in each of the first to third modifications to the first embodiment.

Third Embodiment

Next is a description of a third embodiment. The outline of the use mode of a system according to the third embodiment is similar to that in the foregoing first embodiment, as is the configuration of the system. The outline and the configuration will be described as Appropriate with reference to FIGS. 1 and 2, tor example.

The foregoing first embodiment is described based on the fact that the system 10 transmits a control signal to the target apparatus 20 once every control period, for example. The third embodiment differs from the first embodiment m that the control signal is transmitted a plurality of times in a single control period.

An example of the operation of a system 10 according to the third embodiment will be described below with reference to the sequence diagram shown in FIG. 13.

Figure 13:
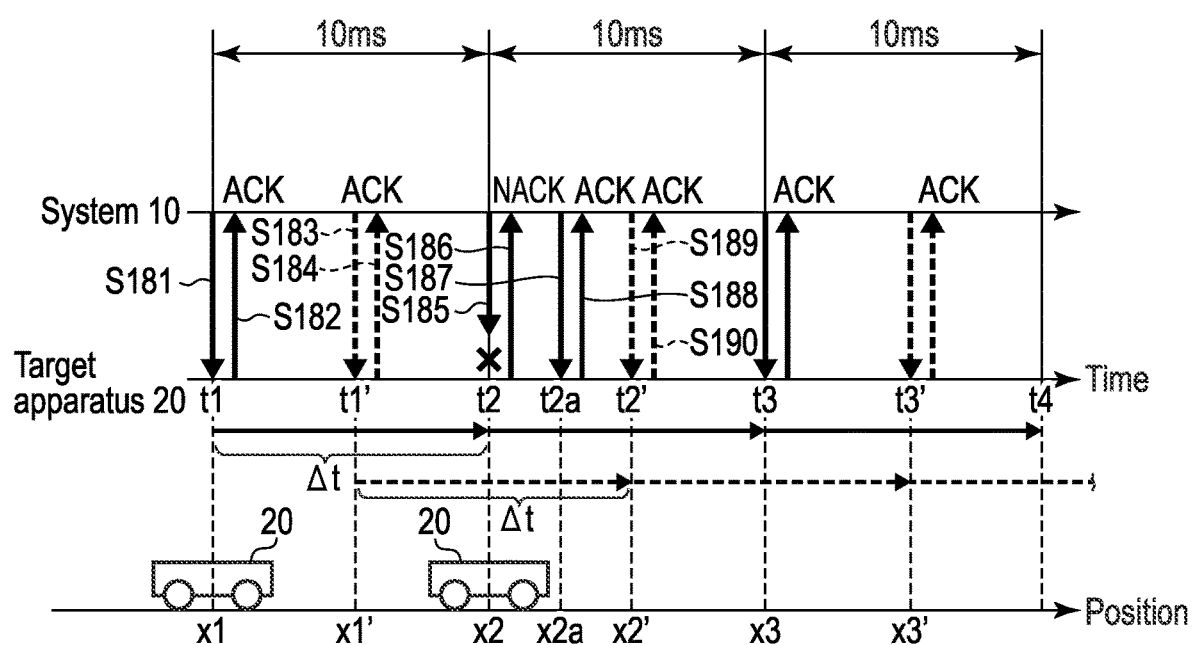
FIG. 13 is a sequence diagram showing an example of the operation of a system according to a third embodiment.

In the example shown in FIG. 13, a control signal is transmitted two times within a single control period. In the following description, the control signal transmitted at the start of the control period (or transmitted first in the same control period) will be referred to as a first control signal, and the control signal transmitted next to the first control signal within the control period will be referred to as a second control signal.

First, as in FIG. 6, the system 10 transmits a first control signal to the target apparatus 20 at position x1 at time t1 (step S81). The first control signal transmitted in step S131 includes a moving direction and a moving speed of the target apparatus 20 and a validity period of the control signal as described above.

In the above-described first embodiment, it has been described that the validity period $\Delta t+\alpha$ is included in the control signal. Assume in the third embodiment that the validity period $\Delta t$ is included in the first control signal transmitted in step 181. The validity period $\Delta t$ is 10 ms corresponding to the control period.

When the process of step S131 is performed, the process of step S182 corresponding to step S112 shown in FIG. 6 is performed.

In the foregoing first embodiment, when a control signal is transmitted at the start of the control period, a control signal subsequent to the former control signal is transmitted at the start of a control period subsequent to the former control period.

In the third embodiment, however, a second control signal is further transmitted in the same control period as the first control signal transmitted in step S181 (step S183). In the example shown in FIG. 13, the second control signal is transmitted from the system 10 to the target apparatus 20 at time t1' between time t1 and time t2. Note that time t1' has only to be any time between time t1 (start time of the control period) and time t2 (start time of the next control period). For example, it nay be the middle time between time t1 and time t2 or may be time closer to time t1 or time t2 than the middle time.

The second control signal transmitted in step S183 includes the moving direction and moving speed of the target apparatus 20. The second control signal (the moving direction and moving speed of the target apparatus 20) is newly generated based on the position of the target apparatus 20 estimated by the position estimator 11*b*, for example, at time t1' (time when the second control signal is transmitted).

As described above, the moving direction and moving speed of the target apparatus 20 included in the second control signal transmitted in step S183 are different from those of the target apparatus 20 included in the first control signal transmitted in step S181, but the validity period included in the second control signal is the same as, for example, the validity period (Δt) included in the first control signal. Note that the time corresponding to the end of the validity period Δt included in the second control signal transmitted in step S183 is time t2' obtained by adding 10 ms, which corresponds to the control period, to time t1'.

Upon receiving the second control signal in step S183, the target apparatus 20 transmits an ACK to the system 10 (step S134).

When the second control signal is transmitted in step S183, the target apparatus 20 moves based on the first control signal transmitted in step S183. Upon receiving the second control signal, the target apparatus 20 updates the first, control signal to the second control signal and moves based on the second control signal.

When the process of step S184 is performed, the processes of steps S135 to S188 corresponding to steps S113 to S116 shown in FIG. 6 are performed.

As described above, the time corresponding to the end of the validity period Δt included in the second control signal transmitted in step S183 is time t2', which is later than the end of the control period in which the first and second control signals are transmitted in steps S181 and S183 (in other words, the start of the subsequent control period). Thus, even if the target apparatus 20 does not receive at time t2 the first control signal transmitted in step S135, it can continue moving based on (the moving direction and moving speed included in) the second control signal transmitted in step S163 until it receives the first control signal to be retransmitted in step S187.

Upon receiving the first control signal in step S187, the target apparatus 20 updates the second control signal transmitted in step S183 to the first control signal retransmitted in step S187 and moves based on the first control signal.

When the process of step S138 is performed, the processes of steps S189 and 190 corresponding to steps 133 and 184 are performed. In the example shown in FIG. 13, the second control signal is transmitted at time t2' between time t2 and time t3.

When the second control signal is transmitted in step S189, the target apparatus 20 moves based on the first control signal retransmitted in step S187. Upon receiving the second control signal, the target apparatus 20 updates the first control signal to the second control signal and moves based on the second control signal.

Although not described in detail, when the process of the step S190 is performed, the system 10 transmits the first control signal subsequent to the second control signal transmitted at time t2', to the target apparatus 20 at time t3, and continues the operation described with reference to FIG. 13.

As described above, in the third embodiment, the first control signal (first and third control signals) is transmitted in a predetermined period at time t1 (first timing) and time t2 (third timing), while the second control signal is transmitted at time t1' (second time) between time t1 and time t2. The time corresponding to the end of the validity period included in the first control signal transmitted at time t1 is the same as time t2.

In the third embodiment, a control signal is transmitted a plurality of times (transmitted in a plurality of systems) within a single control period (frame time). Thus, even though the target apparatus 20 does not receive the first control signal transmitted in accordance with the control period as shown in FIG. 13, it can continue moving based on the second control signal (which is a control signal precedent to the first control signal) transmitted within the last control period until the first, control signal is successfully transmitted. For example, even though the target apparatus 20 does not receive the second control signal within the control period, it can also continue moving based on the first control signal (which is a control signal precedent to the second control signal) transmitted within the control period until the second control signal successfully retransmitted.

The third embodiment makes it possible to control the position of the target apparatus 20 with efficiency (in other words, to prevent the moving efficiency from decreasing).

The third embodiment has been described based on the fact that the first control signal transmitted, for example, at time t1 includes the validity period Δt (in other words, the time corresponding to the end of the validity period is the same as time t2). The time corresponding to the end of the validity period may be before time t2 if it is after time t1' fat which the next second control signal is transmitted).

The third embodiment has been also described based on the fact that the second control signal transmitted, for example, at time t1' includes the validity period Δt (in other words, the time corresponding to the end of the validity period is the same as time t2'). The time corresponding to the end of the validity period may be before time t2' if it is after time t2 (at which the next first control signal is transmitted).

In the third embodiment, using the same method, the first control signal is transmitted to the target apparatus 20 at the start of the control period and the second control signal is transmitted to the target apparatus 20 after the first control signal within the control period. The first and second control signals may be transmitted to the target apparatus 20 by different methods.

An example of the operation of a system 10 according to a first modification to the third embodiment regarding a configuration of transmitting the first and second control signals by different methods will be described below with reference to the sequence diagram of FIG. 14.

First, the processes of steps S201 and S202 corresponding to steps S181 and S182 shown in FIG. 13 are performed.

When the process of step S202 is performed, the system 10 transmits the second control signal to the target apparatus 20 at time t1' (step S203), as in the process of step S183 shown in FIG. 13. The second control signal is a signal newly generated based on the position of the target apparatus 20 estimated by the position estimator 11b at time t1', and includes a moving direction, a moving speed and a validity period Δt corresponding to the position.

As described above, the second control signal transmitted in step S203 is the same as the second control signal transmit red in step S183 shown in FIG. 13. In the first modification to the third embodiment, the second control signal is transmitted by a method other than the method for transmitting the first control signal in step S201.

Specifically, the second control signal is transmitted using at least one of the first to fifth methods described in the second embodiment. The first to fifth methods have been described in detail in the second embodiment.

When the process of step S203 is performed, the processes of steps S204 to S210 corresponding to steps S184 to S190 shown in FIG. 13 are performed.

Figure 14:
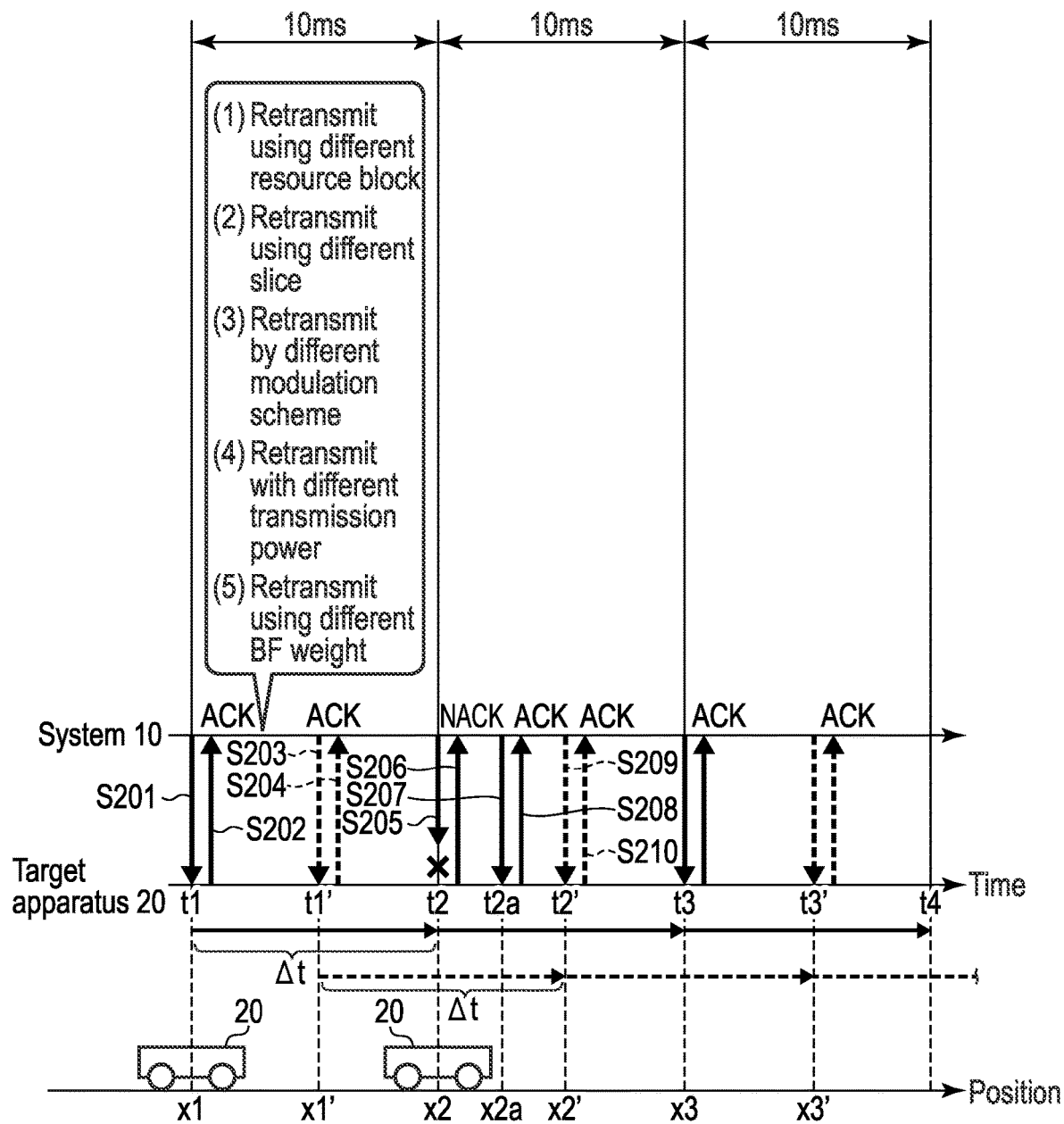
FIG. 14 is a sequence diagram showing an example of the operation of a system according to a first modification to the third embodiment.

Although not shown in FIG. 14, for example, the second control signal in step S209 is transmitted by a method other than the method of transmitting the first control signal in step S205.

The method of transmitting a control signal in step S203 (at least one of the first to fifth methods) and the method of transmitting a control signal in step S209 (at least one of the first to fifth methods) may be the same or different.

Furthermore, in the example shown in FIG. 14, the target apparatus 23 does not receive the first control signal transmitted in step S205. The second control signal may be transmitted by a method other than the method of transmitting the first control signal only when the target apparatus 20 does not receive the first control signal. In other words, for example, when the target apparatus 20 receives the first control signal transmitted in step S201, the second control signal in step S203 tray be transmitted by the same method as the method of transmitting the first control signal. On the other hand, for example, when the target apparatus 20 does not receive the first control signal transmitted in step S205, the second control signal in step S201 may be transmitted by a method other than the method of transmitting the first control signal.

It has been described so far that the second control signal is transmitted by a method other than the method of transmitting the first control signal. For example, when the second control signal is not received, the first control signal subsequent to the second control signal may be transmitted by a method other than the method of transmitting the second control signal.

As described above, in the first modification to the third embodiment, the second control signal is transmitted by changing at least one of the resource block, network slice, modulation method, transmission power and transmission pattern of the antennas 13 used to transmit the first control signal within the control period (using a radio parameter other than that for transmitting the first control signal). The success rate of transmission of the second control signal can thus be improved.

In the third modification and its first modification, the system 10 transmits the second control signal directly to the target apparatus 20. The second control signal may be transmitted through a path other than that in the third embodiment and its first modification.

Next is a description of second and third modifications to the third embodiment regarding a configuration of transmitting a second control signal through a path other than that in the third embodiment and its first modification.

An example of the operation of a system 10 according to a second modification to the third embodiment will be described with reference to the sequence diagram shown in FIG. 15. The second modification to the third embodiment corresponds to a configuration in which the first modification to the second embodiment is applied to the transmission of the second control signal.

In the second modification to the third embodiment, the system 10 is configured to further control the movement of a terminal apparatus 20a in addition to that of the target apparatus 20.

First, the processes of steps S221 and S222 corresponding to steps S181 and S182 shown in FIG. 13 are performed.

When the process of step S222 is performed, a second control signal is transmitted from the system 10. In the second modification to the third embodiment, the second control signal is transmitted to the target apparatus 20 through the terminal apparatus 20a.

Specifically, the system 10 transmits the second control signal to the terminal apparatus 20a (step S223). In this case, the system 10 instructs the terminal apparatus 20a to transmit (transfer) the second control signal transmitted in step S223, to the target apparatus 20. Note that, the second control signal has been described in detail with reference to FIG. 13.

The second control signal thus transmitted in step S223 is received by the terminal apparatus 20a and transmitted to the target apparatus 20 in response to the instruction from the system 10 (step S224).

Upon receiving the second control signal in step S224, the target apparatus 20 transmits an ACK to the terminal apparatus 20a (step S225).

Upon receiving the ACK in step S225, the terminal apparatus 20a transmits the ACK to the system 10 (step S226).

When the process of step S226 is performed, the processes of steps S221 to S230 corresponding to steps S185 to S138 shown in FIG. 13 are performed, and the processes of steps S231 to 234 corresponding to steps S223 to S226 are performed.

Figure 15:
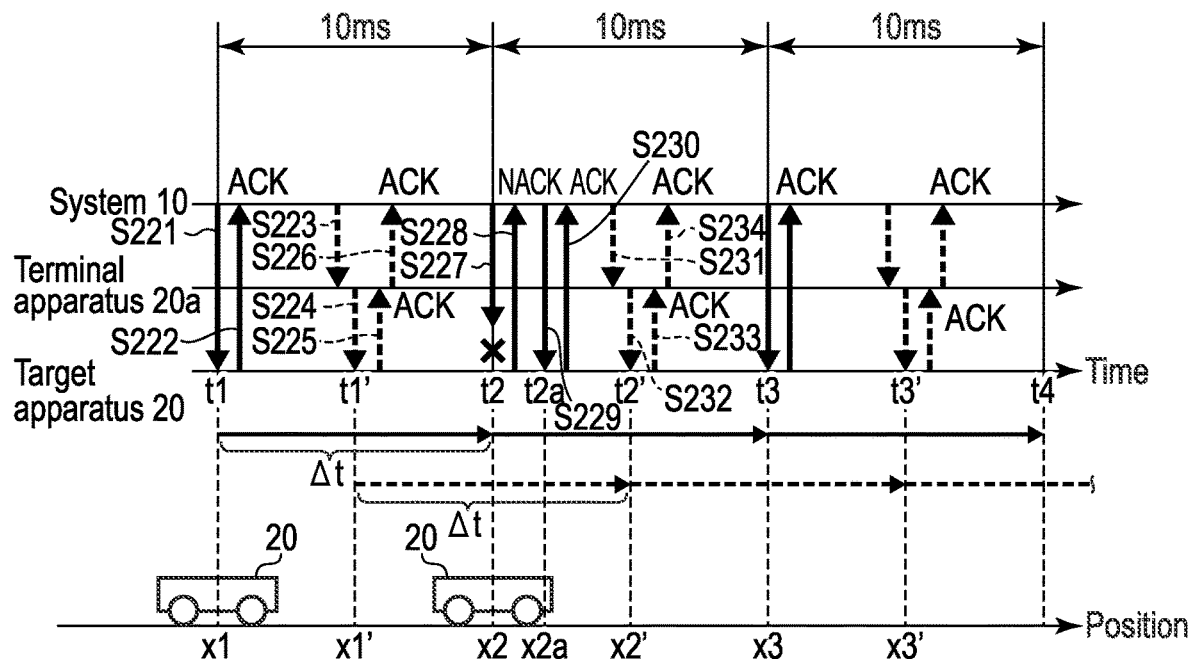
FIG. 15 is a sequence diagram showing an example of the operation of a system according to a second modification to the third embodiment.

In the example shown in FIG. 15, the target apparatus 20 does not receive the first control signal transmitted in step S221. Only in this case, the second control signal may be transmitted through a path other than that for the first control signal (through the terminal apparatus 20a). In other words, for example, when the target apparatus 20 receives the first control signal transmitted in step S221, the system 10 may transmit a second control signal subsequent to the first control signal directly to the target apparatus 20 like the first control signal. On the other hand, for example, when the target apparatus 20 does not receive the first control signal transmitted in step S227, the system 10 has only to transmit a second control signal subsequent to the first control signal to the target apparatus 20 through the terminal apparatus 20a.

It has been described here that the second control signal is transmitted through the terminal apparatus 22a. For example, when the target, apparatus 20 does not receive the second control signal directly from the system 10, the system 10 may transmit a first control signal subsequent to the second control signal to the target apparatus 20 through the terminal apparatus 20a.

The foregoing second modification to the third embodiment is so configured that a control signal is transmitted a plurality of times (transmitted in a plurality of systems) within a single control period. If, in this configuration, the system 10 transmits a first control signal within the control period directly to the target apparatus 20 and also transmits a second control signal within the control period to the target apparatus 20 through a terminal apparatus 20a ether than the target apparatus 20 (in other words, direct communication and relay communication using the terminal apparatus 20a are combined), it is possible to reduce the possibility that the transmission environments of both radio paths for transmitting the first and second control signals within the control period will worsen, with the result that the success rate of transmission of the control signals can be improved.

An example of the operation of a system 10 according to a third modification to the third embodiment will be described with reference to the sequence diagram of FIG. 16. The third modification to the third embodiment corresponds to a configuration in which the second modification to the second embodiment is applied to the transmission of the second control signal within the control period.

Assume in the third modification to the third embodiment that the system 10 includes base stations 10a and 10b.

First, the processes of steps S241 and S242 corresponding to steps S181 and S182 shown in FIG. 12 are performed. Assume that the base station 10a transmits control signal in step S181.

When the process of step S182 is performed, the system 10 transmits a second control signal. In the second modification to the third embodiment, the base station 10b transmits the second control signal to the target apparatus 20.

Specifically, the server apparatus provided in the system 10 transmits the second control signal to the base station 10b. Although not shown in FIG. 16, the server apparatus and the base station 10b are connected by wire, for example, and the server apparatus transmits the second control signal to the base station 10b via wired connection. The second control signal has been described in detail with reference to FIG. 13.

Upon receiving the second control signal from the server apparatus, the base station 10b transmits the second control signal to the target apparatus 20 at time t2a (step S243). In step S243, the base station 10b transmits the control signal wirelessly to the target apparatus 20.

Upon receiving the second control signal in step S243, the target apparatus 20 transmits an ACK to the base station 10b (step S244).

Upon receiving the ACK in step S244, the base station 10b transmits the ACK to the server apparatus. In this case, the base station 10b transmits the ACK to the server apparatus via wired connection.

When the process of stop S244 is performed, the processes of steps S245 to S258 corresponding to steps S385 to S188 shown in FIG. 13 are performed, and the processes of steps S249 and S250 corresponding to steps S243 and S244 are performed.

Figure 16:
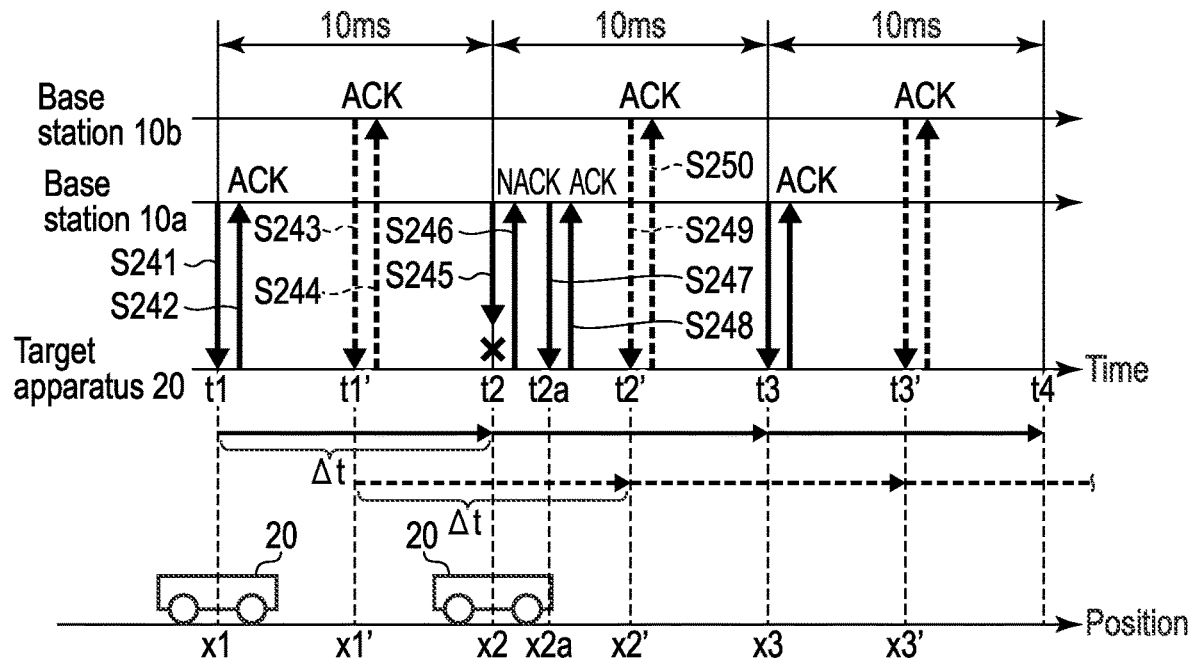
FIG. 16 is a sequence diagram showing an example of the operation of a system; according to a third modification to the third embodiment.

In the example shown in FIG. 16, the target apparatus 20 does not receive the first control signal transmitted in step S245. Only in this case, the second control signal may be transmitted through a path other than that for the first control signal (transmitted from the base station 10b). In other words, for example, when the target, apparatus 20 receives the first control signal transmitted in step S241, the base station 10a may transmit a second control signal subsequent to the first control signal to the target apparatus 20 like the first control signal. On the other hand, for example, when the target apparatus 20 does not receive the first control signal transmitted in step S245, the base station 10b has only to transmit a second control signal subsequent to the first control signal to the target apparatus 20.

It has been described here that the base station 10b transmits a second control signal. For example, when the target apparatus 20 does not receive the second control signal from the base station 10a, the base station 10b may transmit a first control signal subsequent to the second control signal.

In the foregoing third modification to the third embodiment, a first control signal including an instruction to move the target apparatus 20 (moving direction and moving speed) and a validity period of the instruction is generated and transmitted to the target apparatus 20. The time corresponding to the end of the validity period is later than the time (second time) at which a second control signal subsequent to the first control signal is transmitted to the target apparatus 20, and the second control signal is transmitted from the base station 10b.

The foregoing third modification to the third embodiment is so configured that a control signal is transmitted a plurality of times (transmitted in a plurality of systems) within a single control period. If, in this configuration, the base station 10a transmits a first control signal within the control period to the target apparatus 20 and a base station 10b other than the base station 10a transmits a second control signal within the control period to the target apparatus 20 (in other words, a plurality of base stations 10a and 10b transmit the control signals to the target apparatus 20), it is possible to reduce the possibility that the transmission environments of both radio paths for transmitting the first and second control signals within the control period will worsen, with the result that the success rate of transmission of the control signals can be improved.

In the third embodiment (and its first to third modifications), the configurations different from those of the first embodiment have mainly been described. The configurations of the third embodiment can be combined with those of the first embodiment (and its first to third modifications) as appropriate. Specifically, in FIGS. 13 to 16, the control signals (first and second control signals) are shown as including a validity period Δt. The validity period Δt may be the validity period Δt+α described in each of the first embodiment and its first to third modifications.

The configurations of the third embodiment may be combined with those of the second embodiment (and its first and second modifications).

Fourth Embodiment

Next is a description of a fourth embodiment. The outline of the use mode of a system according to the fourth embodiment is similar to that of the system according to the first embodiment described above. It will be therefore described as appropriate with reference to FIG. 1 and the like.

Figure 17:
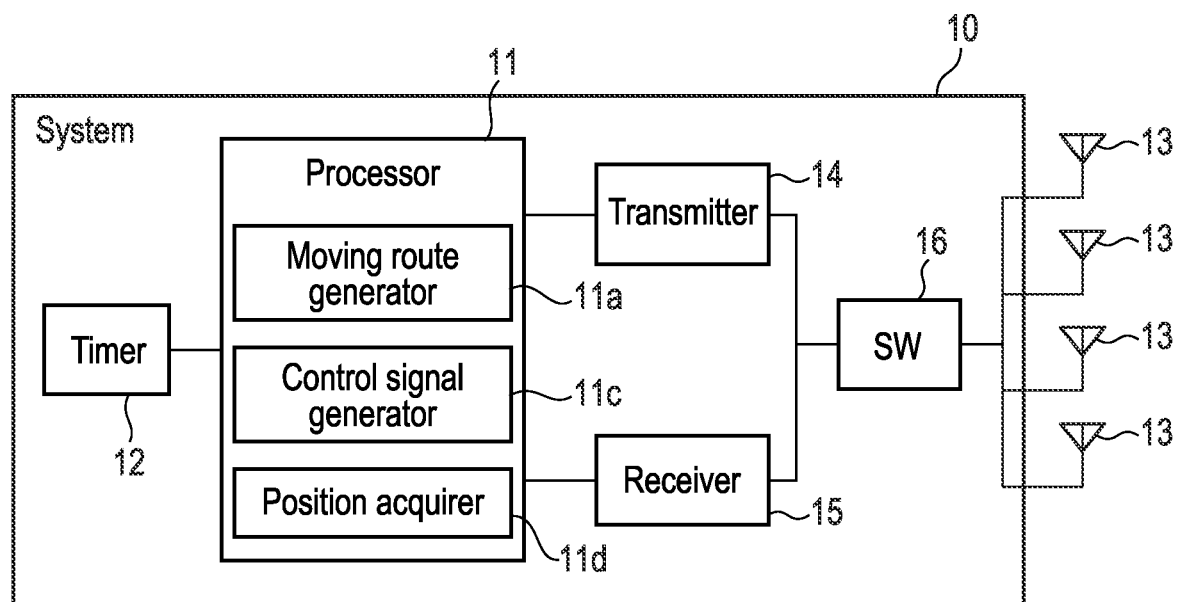
FIG. 17 is a block diagram showing an example of a configuration of a system according to a fourth embodiment.

FIG. 17 is a block diagram showing an example of the configuration of a system 10 according to the fourth embodiment. In FIG. 17, the same portions as those in FIG. 2 are indicated by the same reference symbols, and their detailed descriptions will be omitted. Different portions from those in FIG. 2 will mainly be described.

As shown in FIG. 17, the system 10 includes a processor 11. The processor 11 executes a predetermined program to fulfill a functional portion of a position acquirer 11d in place of the foregoing position estimator 11b shown in FIG. 2.

The position acquirer 11d acquires a position of the target apparatus 20 in a target space (on the map of a target space).

In the first embodiment, as described with reference to FIGS. 3 and 4, the position estimator 10b included in the system 10 estimates the position of the target apparatus 20. The fourth embodiment differs from the first embodiment in that the target apparatus 20 estimates the position thereof.

The position acquirer 11d can acquire the estimated position of the target apparatus 20 from the target apparatus 20.

Figure 18:
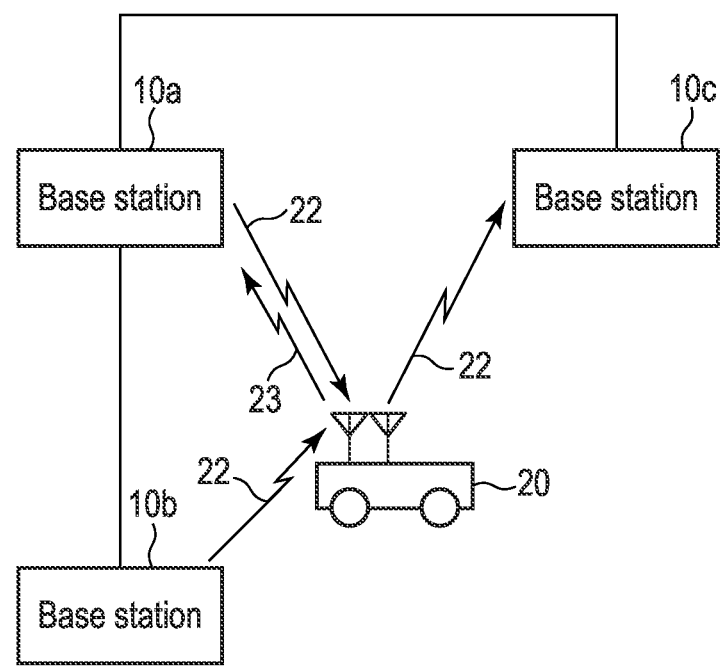
FIG. 18 is a diagram illustrating an example of a process of estimating the position of a target apparatus.

FIG. 18 is a diagram illustrating an example of a process of estimating the position of the target apparatus 20, which is performed in the target apparatus 20. Assume here that the system 10 includes base stations 10a to 10c and the base stations 10a to 10c operate in synchronization with each other. Also, assume that an ID (identifier information) is allocated in advance to each of the base stations 10a to 10c and the target apparatus 20 is notified in advance of the position and ID of each of the base stations 10a to 10c.

The base station 10a transmits a reference signal 22 including the ID of, for example, the base station 10a to the target apparatus 20.

The base station 10*b* transmits a reference signal 22 including the ID of, for example, the base station 10*b* to the target apparatus 20.

Similarly, the base station 10*c* transmits a reference signal 22 including the ID of, for example, the base station 10*c* to the target apparatus 20.

The above reference signals 22 are transmitted simultaneously from the base stations 10*a* to 10*c*.

Then, the target apparatus 20 receives the reference signal 22 from the base station 10*a* to acquire the time at which the reference signal 22 is received from the base station 10*a* (the reception time of the base station 10*a*).

The target apparatus 20 also receives the reference signal 22 from the base station 10*b* to acquire the time at which the reference signal 22 is received from the base station 10*b* (the reception time of the base station 10*b*).

Similarly, the target apparatus 20 receives the reference signal. 22 from the base station 10*c* to acquire the time at which the reference signal 22 is received from the base station 10*c* (the reception time of the base station 10*c*).

The target apparatus 20 can thus estimate its own position based on the difference in reception time between the reference signals 22 received from the base stations 10*a* to 10*c* and the speed of light (electromagnetic wave to carry the reference signals).

When the target apparatus 20 estimates its own position as described above, it transmits a signal 23 indicating the position to the system 10 (server apparatus). The position acquirer 11*d* can thus acquire the position of the target apparatus 20 based on the signal 23 transmitted from the target apparatus 20.

It has been described that the position of the target apparatus 20 is estimated by performing the process described with reference to FIG. 18. The position of the target apparatus 20 may be estimated by performing another process.

Specifically, when, for example, a camera is mounted on the target apparatus 20, the position of the target apparatus 20 can be estimated based on an image captured by the camera.

Unlike in the foregoing first embodiment, the target apparatus 20 of the fourth embodiment grasps its own position. If, therefore, the target apparatus 20 can grasp, for example, the position to which the target apparatus 20 is to move (hereinafter referred to as a target position), it can grasp the direction in which the target apparatus 20 is to move (moving direction).

It is therefore assumed that the control signal in the fourth embodiment does not include the moving direction but the target position described in the first embodiment. Since, in this case, the target, apparatus can operate so as to continue moving until it reaches the target position, the control signal in the fourth embodiment does not include the validity period described in the first embodiment. That is, the control signal in the fourth embodiment includes the moving speed and the target position. Note that the control signal is generated based on the moving route of the target apparatus 20 generated by the moving route generator 11*a* and the position of the target apparatus 20 acquired by the position acquirer 11*d*.

An example of the operation of a system according to a comparative example of the fourth embodiment will be described with reference to the sequence diagram shown in FIG. 19. In FIG. 19, the system according to the comparative example will be described as a system 10'.

In the comparative example, a period (control period) in which the system 10' generates a control signal and transmits it to the target apparatus 20 is defined as frame time (10 ms) in the 5G mobile communication system.

First, assuming that the system 10' transmits the control signal at time t1 corresponding to the start of the control period, the target apparatus 20 estimates its own position (position x1) at timing before the time t1, and transmits the position (a signal indicative of the position) to the system 10' (step S301).

When the process of step S301 is performed, the system 10' acquires (receives) the position of the target apparatus 20 transmitted in step S301.

At time t1, the system 10' transmits a control signal to the target apparatus 20 (step S302). The control signal transmitted in step S302 includes the moving speed and target position of the target apparatus 20 as described above. The target position includes a position which the target apparatus 20, which moves at the moving speed included in the control signal, reaches (is to reach) in 10 ms corresponding to the control period. Assume in the example shown in FIG. 19 that position x2 is set as the target position.

When the target apparatus 20 receives the control signal transmitted in step S302, the target apparatus 20 transmits an ACK to the system 10' (step S303). The system 10' receives the ACK transmitted in step S303.

When the target apparatus 20 receives the control signal transmitted in step S302 as described above, it moves toward the target, position included in the control signal at the moving speed included in the control signal. This movement is continued until the position of the target apparatus 20 estimated by the target apparatus 20 reaches the target position included in the control signal as described above.

Assume here that the target apparatus 20 has reached the position x2 as a result of the continuation of movement of the target apparatus 20 until time t2 as described above.

Assuming that the system 10' transmits a control signal at time t2 corresponding to the start of the next control period, the target apparatus 20 estimates the position (position x2) of the target apparatus 20 at timing before the time t2 and transmits the position (a signal indicative of the position) to the system 10' (step S304).

When the process of step S304 is performed, the system 10' acquires (receives) the position of the target apparatus 20 transmitted in step S304.

At time t2, the system 10' transmits a control signal to the target apparatus 20 (step S305). For example, position x3 is set as the target position included in the control signal transmitted in step S305.

When the target apparatus 20 receives the control signal transmitted in step S305 (in other words, the target apparatus 20 succeeds in receiving the control signal), it transmits an ACK to the system 10' and can continue moving based on the control signal (moving speed and target position).

On the other hand, it is assumed that the target apparatus 20 does not receive the control signal transmitted in step S305 (in other words, the target apparatus fails to receive the control signal) depending on the environments around the system 10' or the target. Apparatus 20, as shown in FIG. 19. In this case, the target apparatus 20 transmits an NACK to the system 10' (step S307).

The target position included in the control signal transmitted in step S302 is the position x2, and the target apparatus 20 reaches the target position at time t2. In the comparative example of the fourth embodiment, a position where the target apparatus 20 can reach in the control period (time corresponding to the control period) is set as the target position included in the control signal. If, therefore, a control signal subsequent to the control signal transmitted in step S302 is not received at time t2, the target apparatus 20 that has already reached the position x2 cannot continue moving but steps at the position x2.

The system 10' receives the NACK transmitted in step S306. Upon receiving the NACK, the system 10' retransmits the control signal transmitted in step S305 at time t2a, for example (step S307).

Upon receiving the control signal retransmitted in step S307, the target apparatus 20 transmits an ACK to the system 10' (step S308).

Upon receiving the control signal in step S307 as described above, the target apparatus 20 moves toward the target position included in the control signal at the moving speed included in the control signal (in other words, the target apparatus 20 restarts to move).

Assuming that the target apparatus 20 receives the control signal at time t2, it can continue moving from time t2 to time t3 corresponding to the start of the next control period (time t3 at which the next control signal is transmitted). The target apparatus 20 can thus reach the position x3 (target position) at time t3.

On the other hand, when the target apparatus 20 does not receive the control signal at time t2 as described above, it stops from time t2 to time t2a. Even though the target apparatus 20 receives the control signal retransmitted at time t2a, it cannot reach the position x3 at time t3. In other words, the time at which the target apparatus 20 can reach the target position x3 is later than the time t3.

According to the operation of the system 10' shown in FIG. 19 described above, when the target apparatus 20 does not receive the control signal at, for example, time t2, it cannot be operated with efficiency (the mobility efficiency decreases).

An example of the operation of the system 10 according to the fourth embodiment will be described with reference to the sequence diagram shown in FIG. 20. In this example, the same operations as those of the system 10' according to the comparative example of the fourth embodiment shown in FIG. 15 will not be described in detail, but the operations other than those in FIG. 19 will mainly be described.

First, the process of step S311 corresponding to step S301 shown in FIG. 19 is performed. The position transmitted from the target apparatus 20 in step S311 is received by a base station and transmitted to the server apparatus therefrom. The server apparatus (control signal generator 11c) generates a control signal based on the position transmitted from the base station. The control signal thus generated is transmitted from the server apparatus to the base station.

At time t1, the system 10 (base station) transmits a control signal to the target apparatus 20 (step S302). The control signal transmitted in step S302 is generated based on the moving route (generated by the moving route generator 11a) and position (acquired by the position acquirer 11d) of the target apparatus 20 as described above, and includes the moving speed and target position of the target apparatus 20.

As described above, the system 10 includes the base station and the server apparatus. The server apparatus (control signal generator 11c) generates a control signal and transmits the control signal to the base station in order to transmit the control signal to the target apparatus 20. The base station thus transmits the control signal to the target apparatus 20.

The moving speed included in the control signal transmitted in step S312 is the same as that included in the control signal transmitted in step S302 shown in FIG. 19, whereas the target position included in the control signal transmitted in step S312 is different from that included in the control signal transmitted in step S302.

Specifically, when the position of the target apparatus 20 is the position x1, the control signal transmitted in step S302 shown in FIG. 19 includes the target position x2. However, the control signal transmitted in step S312 includes a position beyond the position x2 (that is, target position x2+α obtained by adding α to the position x2). In other words, as the control signal in the fourth embodiment, a target position that is farther than a position where the target apparatus 20 is to reach at time when the next control signal is transmitted, is set.

In the fourth embodiment, the position x2 is a position which the target apparatus 20 can reach in the control period (10 ms) when it moves at the moving speed included in the control signal as described above. The value of α added to the position x2 is set (selected) based on, for example, the moving route and position of the target apparatus 20. Specifically, the value of α is set in such a range as not to deviate from the moving route of the target, apparatus 20, for example.

If, for example, a large value is set as a (in other words, a position far from the target apparatus 20 is set as the target position), the target apparatus 20 is highly likely to contact other terminal apparatuses moving in the target space together with the target apparatus 20 and workers and the like placed in the target space. For this reason, a may be set based on the moving routes and positions of the other terminal apparatuses, the positions of the workers placed in the target space, and the like.

When the target apparatus 20 receives the control signal transmitted in step S312, the process of step S313 corresponding to step S303 shown in FIG. 19 is performed.

When the target apparatus 20 receives the control signal transmitted in step S312 as described above, it moves toward the target position included in the control signal at the moving speed included in the control signal.

It is assumed that the target apparatus 20 has reached the position x2 as a result of the continuation of movement of the target apparatus 20 until time t2 as described above.

When the process of step S313 is performed, the process of step S314 corresponding to step 304 shown in FIG. 19 is performed.

At time t2, the system 10 transmits a control signal to the target apparatus 20 (step S315). The control signal transmitted in step S315 includes, for example, target, position x3+α (position beyond the position x3 which the target apparatus 20 is to reach between time t2 and time t3).

As shown in FIG. 20, when the target apparatus 20 does not receive the control signal transmitted in step S315, the process of step S316 corresponding to step S306 shown in FIG. 19 is performed.

Since the target position x2+α included in the control signal transmitted in step S312 is farther than the position x2 which the target apparatus 20 can reach in the control period (10 ms), the time when the target apparatus 20 is to reach the target position x2+α is later than the time t2 when the control signal is transmitted in step S315. In the fourth embodiment, therefore, even though the target apparatus 20 does not receive the control signal transmitted in step S315, it can continue moving based on (the moving speed and target position included in) the control signal transmitted in step S312.

When the process of step S316 is performed, the processes of steps S317 and S318 corresponding to steps S307 and S318 shown in FIG. 19 are performed.

When the control signal is retransmitted in step S317, the target apparatus 20 is moving based on the control signal transmitted in step S312. However, when the target apparatus 20 receives the control signal retransmitted in step S317, it may update the control signal transmitted in step S312 to the control signal retransmitted in step S317, and move based on the updated control signal.

Although net described in detail, when the process of step S318 is performed, the system 10 transmits a control signal subsequent to the control signal (control signal retransmitted at time t2a), which is transmitted at time t2, to the target apparatus 20 at time t3, and continues the operation described with reference to FIG. 20.

According to the operation of the system 10 shown in FIG. 20, the target position x2+α (which the target apparatus 20 is to reach after the end of the control period) is set in the control signal transmitted at the time t1. Thus, even though the target apparatus 20 does not receive the control signal at time t2, for example, it can continue moving from time t2 until time t2a at which the control signal is retransmitted.

In the comparative example shown in FIG. 19, the target apparatus 20 stops from time t2 to time t2a, whereas in the fourth embodiment, the target apparatus 20 can continue moving from time t2 to time t2a. The target apparatus 20 can thus reach the position x2a at time t2a and then the position x3 at time t3.

As described above, in the fourth embodiment, a first control signal including a first target position of the target apparatus 20 is generated to move (operate) the target apparatus 20, and the generated first control signal is transmitted to the target apparatus 20 wirelessly at a first timing (time t1). Furthermore, in the fourth embodiment, when the target apparatus 20 is moved by the first target position, a second control signal including a second target position of the target apparatus 20 is generated to move (operate) the target apparatus 20 further, and the generated second control signal is transmitted to the target apparatus 20 wirelessly at a second timing (time t2). In this case, the first target position included in the first control signal is set farther than the position which the target apparatus 20 is to reach at the second timing when the system 10 transmits the second control signal to the target apparatus 20.

In the fourth embodiment, with the foregoing configuration, even though the target apparatus 20 does not receive the control signal, it can continue moving based on a control signal that has already been received before the control signal is received.

Therefore, in the fourth embodiment, the target apparatus 20 can be operated efficiently (to prevent the moving efficiency from decreasing).

In the fourth embodiment, the target position included in the control signal is set based on, for example, the moving route and position of the target apparatus 20. The following are descriptions of first to third modifications to the fourth embodiment regarding the setting of the target position.

Note that the first to third modifications to the fourth embodiment correspond to those to the first embodiment described above, except that the position of the target apparatus 20 is estimated by the target apparatus 20 and the target position is included in the control signal. In the first to third modifications to the fourth embodiment, the same portions as those of the first to third modifications to the first embodiment are not described in detail.

An example of the operation of a system 10 according to a first modification to the fourth embodiment will be described with reference to the sequence diagram shown in FIG. 21.

First, the process of step S321 corresponding to step S311 shown in FIG. 20 is performed.

Then, at time t1, the system 10 transmits a control signal to the target apparatus 20 (step S322). The control signal transmitted in step S322 includes the moving speed and target position of the target apparatus 20 as described above.

As described in the first modification to the first embodiment, the control signal is retransmitted within a control period.

In the first modification to the fourth embodiment, therefore, the target position included in the control signal is defined as a position which the target apparatus 20 is to reach in a time period corresponding to the control period in which the control signal is transmitted and the next control pence (which is twice as the control period). In this first modification, as the target position included in the control signal, a position which the target apparatus 20 is to roach at the time when a control signal after a control signal subsequent to the control signal is transmitted, is set.

Figure 21:
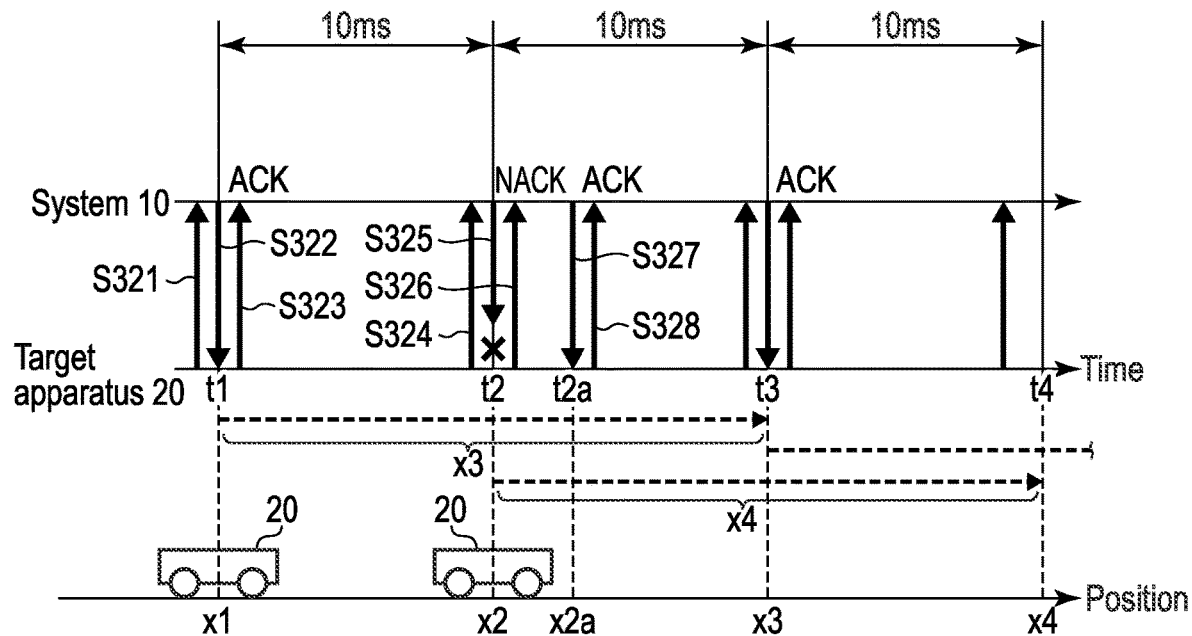
FIG. 21 is a sequence diagram showing an example of the operation of a system according to a first modification to the fourth embodiment.

In the example shown in FIG. 21, a position x3 which the target apparatus 20 is to reach at time t3 is set as the target position included in the control signal transmitted in step S322.

When the process of step S322 is performed, the processes of steps S323 to S328 corresponding to steps S313 to S318 shown in FIG. 20 is performed.

In this case, a target position x4 is set in the control signal transmitted in step S325 (and the control signal retransmitted in step S327). The same applies to other control signals.

According to the first modification to the fourth embodiment, a position which the target apparatus 20 is to reach in a time period that is twice the control period is set as a target position. Even though the target apparatus 20 fails to receive the control signal, for example, at time t2, it can continue moving until the system 10 succeeds in retransmitting the control signal. The target apparatus 20 can thus be prevented from decreasing in its moving efficiency.

In the example of FIG. 21, the target position included in the control signal transmitted, for example, at time t1 is the same as the position x3 where the target apparatus 20 is to reach at time t3 (third timing). The target position may be closer than the position x3.

An example of the operation of a system 10 according to a second modification to the fourth embodiment will be described with reference to the sequence diagram shown in FIG. 22.

First, the process of step S331 corresponding to step S311 shown in FIG. 20 is performed.

Then, at time t1, the system 10 transmits a control signal to the target apparatus 20 (step S332). The control signal transmitted in step S332 includes the moving speed and target position of the target apparatus 20 as described above.

When wireless communication is performed between the system 10 and the target apparatus 20 as described in the second modification to the first, embodiment, the system 10 determines a slot indicating a time period in which the system 10 can transmit a control signal to the target; apparatus 20 (the system 10 allocates the target apparatus 20 a slot in which the target apparatus 20 receives a control signal), and notifies the target apparatus 20 of the slot in advance.

In the second modification to the fourth embodiment, therefore, the target position included in the control signal is defined as a position which the target apparatus 20 is to reach at the time corresponding to the end of a time period indicated by the last slot of the target apparatus 20, which is allocated to a control period subsequent to the control period in which the control signal is transmitted.

Figure 22:
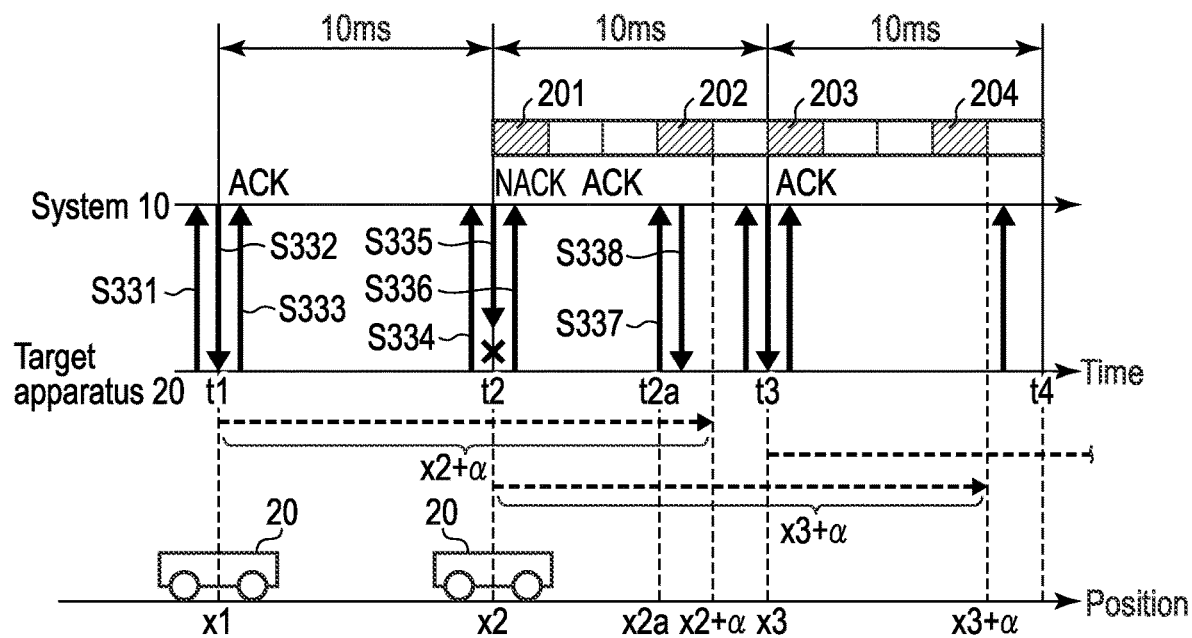
FIG. 22 is a sequence diagram showing an example of the operation of a system according to a second modification to the fourth embodiment.

In the example shown in FIG. 22, as the target position included in the control signal transmitted in step S332, a position x2+α which the target, apparatus 20 is to reach at the time corresponding to the end of a time period indicated by the last slot 202 of the target apparatus 22, which is allocated between time t2 and time t3, is set.

When the process of step 332 is performed, the processes of steps S332 to S338 corresponding to steps S313 to 318 shown in FIG. 20 are performed.

In the control signal transmitted in step S335 (and the control signal retransmitted in step S337), a position x3+α which the target apparatus 20 is to reach at the time corresponding to the end of a time period indicated by the last slot 224 of the target apparatus 20, which is allocated between time t3 and time t4, is set. The same applies to other control signals.

According to the second modification to the fourth embodiment, a position which the target apparatus 20 is to reach at the time corresponding to the end of the last slot of the target apparatus in a control period subsequent to the control period in which the control signal is transmitted, is set as a target position. Even though the target apparatus 20 fails to receive the control signal, for example, at time t2, it can continue moving until the system 10 succeeds in retransmitting the control signal. The target apparatus 20 can thus be prevented from decreasing in its moving efficiency.

In the example of FIG. 22, the target position induced in the control signal transmitted at time t1 is the same as the position x2+α which the target apparatus 20 is to reach at the time corresponding to the end of a time period indicated by the last slot of the target apparatus 20. The target position may be closer than the position x2+α.

An example of the operation of a system 10 according to a third modification to the fourth embodiment will be described with reference to the sequence diagram shown in FIG. 23.

First, the process of step S341 corresponding to step S311 shown in FIG. 20 is performed.

Then, at time t1, the system 10 transmits a control signal to the target apparatus 20 (step S342). The control signal transmitted in step S342 includes the moving speed and target position of the target apparatus 20 as described above.

In the third modification to the first embodiment described above, the validity period included in the control signal is set using average retransmission time, whereas in the third modification to the fourth embodiment, the target position included in the control signal is set using the average retransmission time. In this case, as the target position included in the control signal, a position which the target apparatus 20 is to reach at the time obtained by adding the average retransmission time to the time at which a control signal subsequent to the control signal is transmitted, is set.

In the example shown in FIG. 23, as the target position included in the control signal transmitted in step S342, a position x2+α which the target apparatus 20 is to reach at the time obtained by adding the average retransmission time to time t2, t3 set.

When the process of stop S342 is performed, the processes of steps S343 to S348 corresponding to steps S313 to S318 shown in FIG. 20 are performed.

In the control signal transmitted in step S345 (and the control signal retransmitted in step S347), a position x3+α which the target apparatus 20 is to reach at the time obtained by adding the average retransmission time to the time t3 is set. The sane applies to other control signals.

According to the third modification to the fourth embodiment described above, a position which the target apparatus 20 is to reach at the time obtained by adding the average retransmission time to the control period. Even though the target apparatus 20 fails to receive the control signal, for example, at time t2, it can continue moving until the system 10 succeeds in retransmitting the control signal. The target apparatus 20 can thus be prevented from decreasing in its moving efficiency.

In the example of FIG. 23, the target position included in the control signal transmitted at time t1 is the same as the position x2+α which the target apparatus 20 is to reach at the time obtained by adding the average retransmission time to the control period. The target position nay be closer than the position x2+α.

The first to third modifications to the fourth embodiment have been described so far. In the fourth embodiment, the target position included in the control signal may be set from another viewpoint if a next control signal is retransmitted before the target apparatus reaches the target position.

It is assumed in the fourth embodiment that when the target apparatus 20 does not receive a control signal, the system 10 retransmits the same control signal. The control signal to be retransmitted may be newly generated based on the position of the target apparatus 20 at the time of retransmission (in other words, the moving direction and moving speed may be changed at the time of retransmission).

It has been described in the fourth embodiment that the target apparatus 20 estimates its position and grasps the position. If the system 10 notifies the target apparatus 20 of the position of the target apparatus 20, the system 10 may estimate the position of the target apparatus 20 as described in the foregoing first embodiment.

As described above, in the fourth embodiment, even though the target apparatus 20 estimates its position, the control signal (control signal including a validity period) described in the first embodiment and the like can be generated based on the estimated position.

Fifth Embodiment

Next is a description of a fifth embodiment. The outline of the use mode of a system according to the fifth embodiment is similar to that of the system according to the first embodiment, and the configuration of the system is similar to that of the system according to the fourth embodiment. They will be therefore described as appropriate with reference to FIGS. 1 and 17 and the like.

It has been described in the fourth embodiment that when the target apparatus 20 does not receive the control signal transmitted from the system 10, the system 20 retransmits the control signal. The fifth embodiment differs from the fourth embodiment in the method of retransmitting the control signal.

Note that the fifth embodiment corresponds to the second embodiment described above, except that the position of the target apparatus 20 is estimated by the target apparatus 20 and the target position is included in the control signal, which has been described in the fourth embodiment. In the fifth embodiment, the same portions as these of the second embodiment are net described in detail.

Figure 24:
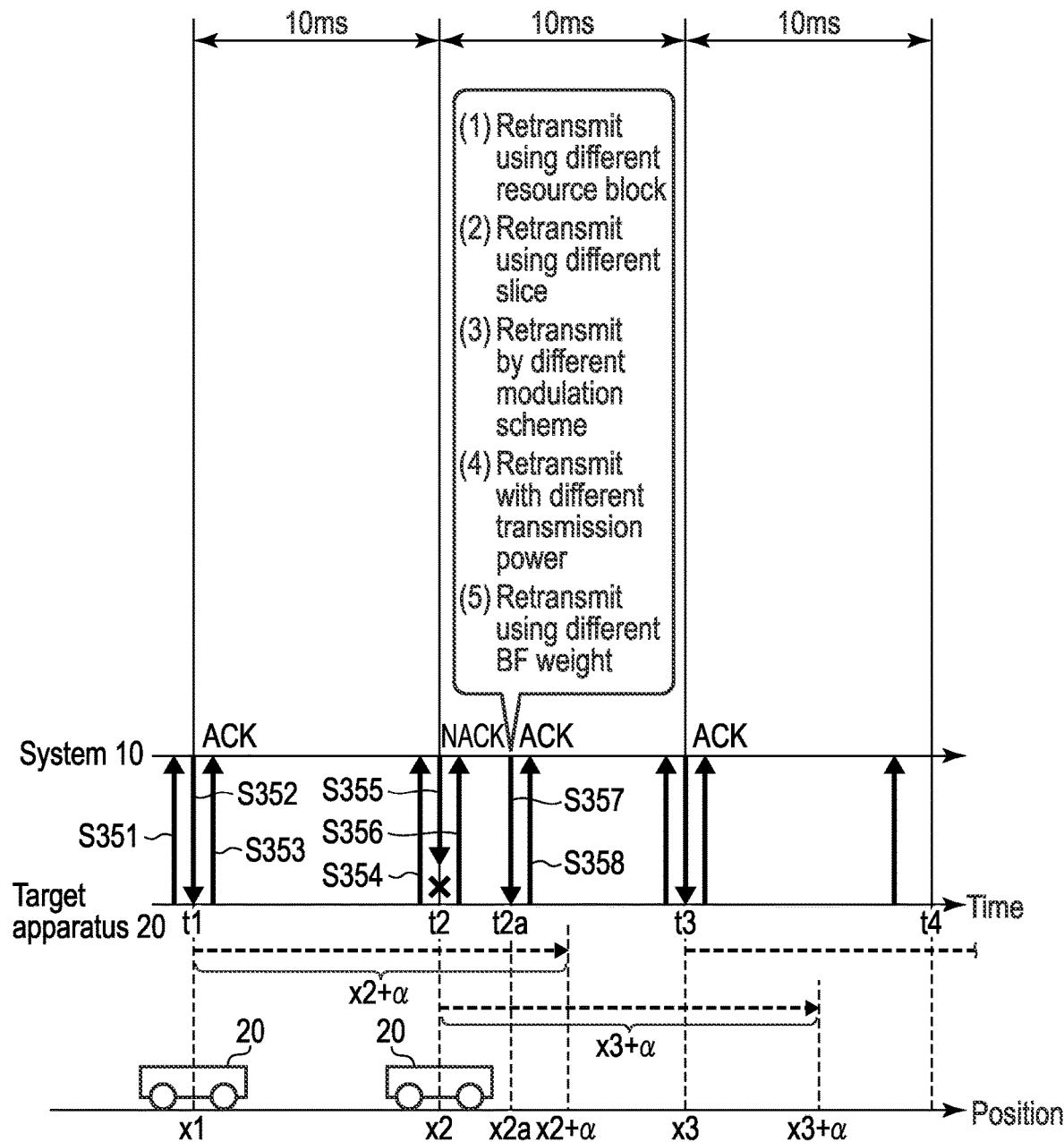
FIG. 24 is a sequence diagram showing an example of the operation of a system according to fifth embodiment.

An example of the operation of a system 10 according to the fifth embodiment will be described with reference to the sequence diagram shown in FIG. 24.

First, the processes of steps S351 to S356 corresponding to steps S311 to S16 shown in FIG. 20 are performed.

Upon receiving the NACK from the target apparatus 20 in step S356, the system 10 retransmits the control signal, which is transmitted in step S355, to the target apparatus 20 (step S357). In step S357, the system 10 retransmits (transmits) the control signal by a method other than that for transmitting the control signal in step S355.

The process of step S357 differs from that of the second embodiment in that the control signal retransmitted to the target apparatus 20 includes a target position, but otherwise it is similar to the process of step S55 shown in FIG. 10, and therefore, its detailed description will be omitted.

When the process of step S57 is performed, the process of step S358 corresponding to step S318 shown in FIG. 20 is performed.

Like in the second embodiment, in the fifth embodiment, the control signal is retransmitted by changing at least one of the resource block, network slice, modulation method, transmission power, and transmission pattern of the antennas 13, which are used in transmitting the control signal (using radio parameters other than those used in transmitting the control signal that was not received by the target apparatus 20). Thus, the success rate of retransmission (transmission) of the control signal can be improved.

In the fifth embodiment, the configuration in which the system 10 retransmits (transmits) the control signal directly to the target apparatus 20 has been described. The control signal may be retransmitted through a path other than that in the fifth embodiment.

Below is a description of each of first and second modifications to the fifth embodiment regarding the configuration of retransmitting a control signal through a path other than that of the fifth embodiment.

Note that the first to third modifications to the fifth embodiment correspond to those to the second embodiment described above, except that the position of the target apparatus 20 is estimated by the target apparatus and the target position is included in the control signal. In the first and second modifications to the fifth embodiment, the same portions as those of the first and second modifications to the first embodiment are not described in detail.

Figure 25:
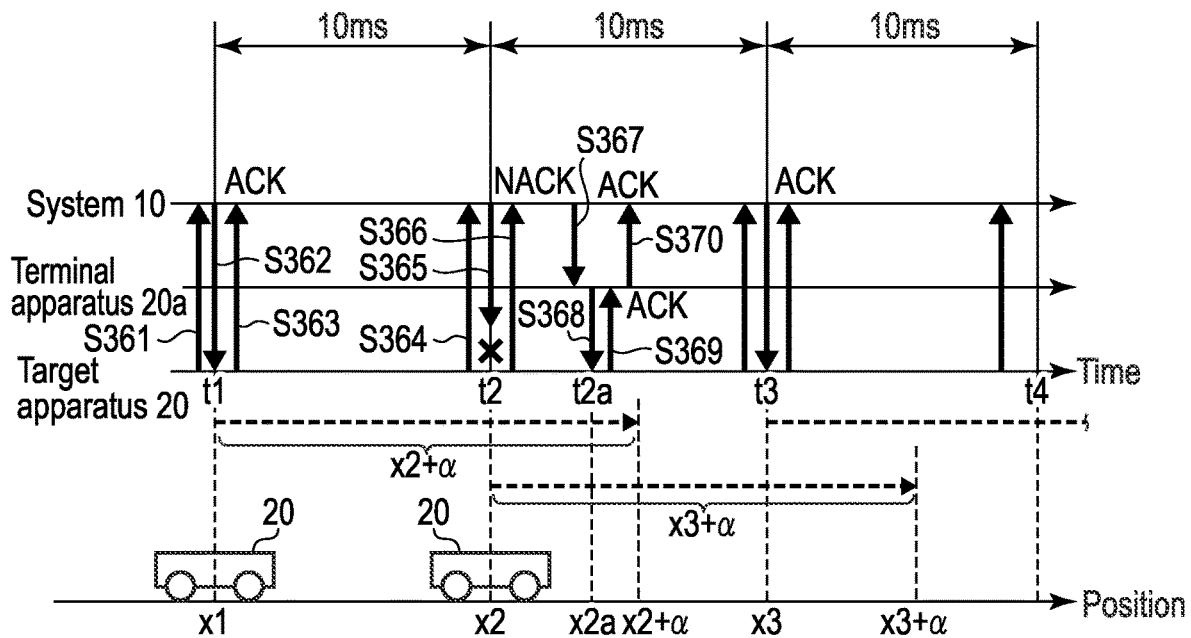
FIG. 25 is a sequence diagram showing an example of the operation of a system according to a first modification to the fifth embodiment.

An example of the operation of a system 10 according to the first modification to the fifth embodiment will be described with reference to the sequence diagram shown in FIG. 25. Assume in this first modification that, the system 10 is, for example, configured to further control the movement (position) of another terminal apparatus 20a in addition to the target apparatus 20, as in the foregoing first modification to the second embodiment.

First, the processes of steps S361 to S366 corresponding to steps S311 to S316 shown in FIG. 20 are performed.

When the process of step S366 is performed, the system 10 retransmits the central signal, which is transmitted in step S365 (the control signal not received by the target apparatus 20), to the target apparatus 20. The control signal, is retransmitted to the target apparatus 20 through the terminal apparatus 20a, as described in the first modification to the second embodiment. In this case, the processes of steps S367 to S370 are performed.

Figure 11:
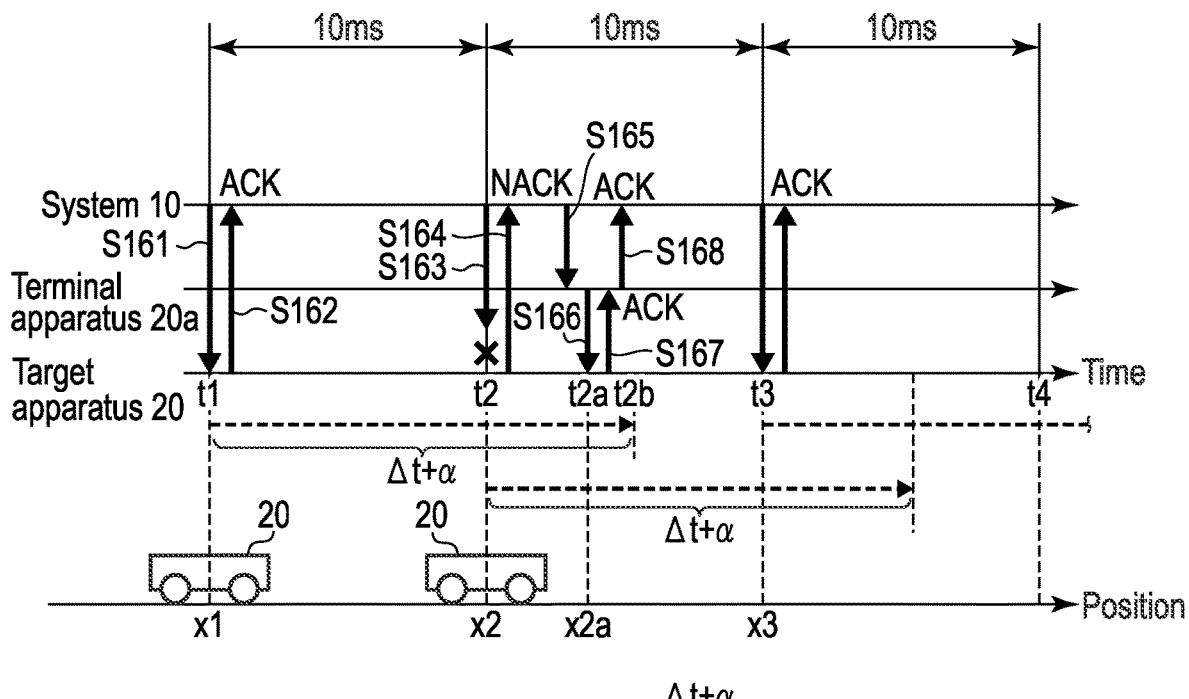
FIG. 11 is a sequence diagram showing an example of the operation of a system according to a first modification to the second embodiment.

The processes of steps S367 to S370 differ from those of the first modification to the second embodiment in that the control signal retransmitted to the target apparatus 20 includes a target position, but otherwise they are similar to those of steps S165 to S168 shown in FIG. 11, and therefore, their detailed descriptions will be omitted.

In the first modification to the fifth embodiment, the control signal is retransmitted to the target apparatus 20 via the terminal apparatus 20a other than the target apparatus 20 (using another terminal apparatus as a relay), as described in the first modification to the second embodiment. With this configuration, the control signal is retransmitted through a wireless route other than that for the control signal not received by the target apparatus 20. The success rate of retransmission (transmission) of the control signal can thus be improved.

Figure 26:
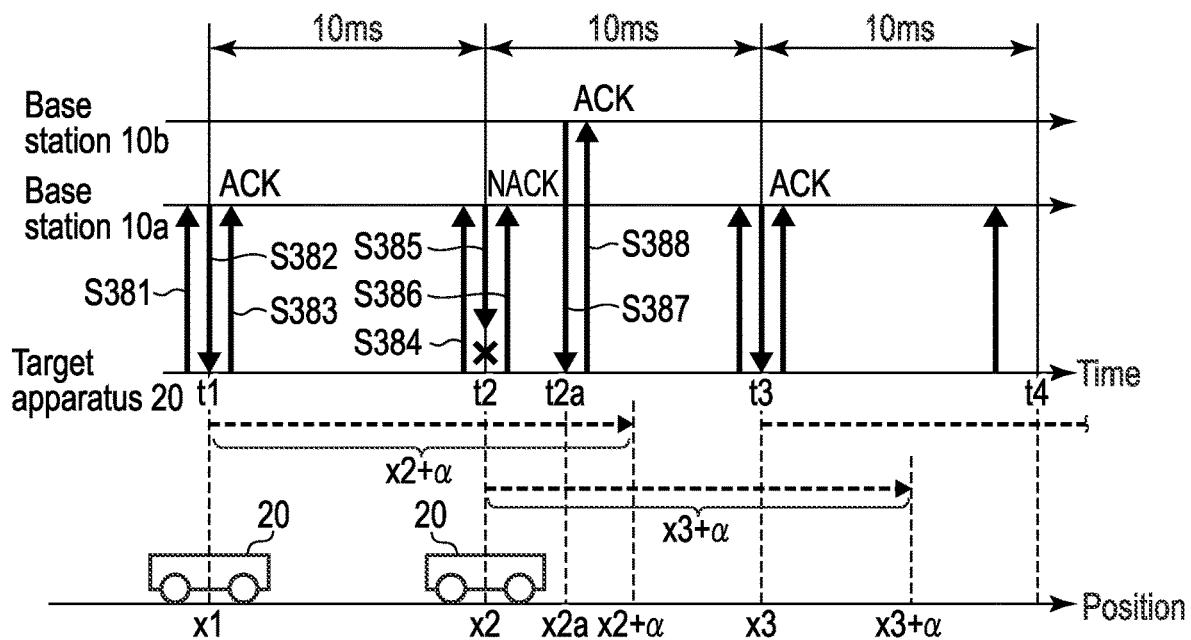
FIG. 26 is a sequence diagram showing an example of the operation of a system according to a second modification to the fifth embodiment.

An example of the operation of a system 10 according to the second modification to the fifth embodiment will be described with reference to the sequence diagram shown in FIG. 26. Assume in this second modification that the system 10 includes base stations 10a and 10b as described in the second modification to the second embodiment.

First, the processes of steps S331 to S386 corresponding to steps S311 to S316 shown in FIG. 20 are performed. Assume that the base station 10a transmits a control signal in steps S382 and S385 as shown in FIG. 26.

When the process of step S386 is performed, the control signal transmitted in step S385 (the control signal not received by the target apparatus 20) is retransmitted to the target apparatus 20. This control signal is retransmitted to the target apparatus 20 from the base station 10b, as described in the second modification to the second embodiment. In this case, the processes of steps S387 and S388 are performed.

The processes of steps S387 and S383 differ from those of the second modification to the second embodiment in that the control signal retransmitted to the target apparatus 20 includes a target position, but otherwise they are similar to those of steps S175 and S176 shown in FIG. 12, and therefore, their detailed descriptions will be omitted.

In the second modification to the fifth embodiment, the control signal is retransmitted to the target apparatus 23 from the base station 10b other than the base station 10a, as described in the second modification to the second embodiment. With this configuration, the control signal is retransmitted through a wireless route other than that for the control signal not received by the target, apparatus 20. The success rate of retransmission (transmission) of the control signal can thus be improved.

The configuration described in the second embodiment can be combined with that in the first embodiment. The configuration described in the fifth embodiment can also be combined with that in the fourth embodiment as appropriate.

Sixth Embodiment

Next is a description of a sixth embodiment. The outline of the use mode of a system according to the sixth embodiment is similar to that of the system according to the first embodiment, and the configuration of the system is similar to that of the system according to the fourth embodiment. They will be therefore described as appropriate with reference to FIGS. 1 and 17 and the like.

It has been described in the fourth embodiment that, the system 10 transmits a control signal to the target apparatus 20 once, e.g., for each control period. The sixth embodiment differs from the fourth embodiment in that a control signal is transmitted a plurality of times within a single control period.

Note chat the sixth embodiment corresponds to the third embodiment described above, except that the position of the target apparatus 20 is estimated by the target apparatus 20 and the target position is included in the control signal, which has been described in the fourth embodiment. In the sixth embodiment, the same portions as those of the third embodiment are not described in detail.

An example of the operation of a system 10 according to the sixth embodiment will be described with reference to the sequence diagram shown in FIG. 27.

Figure 27:
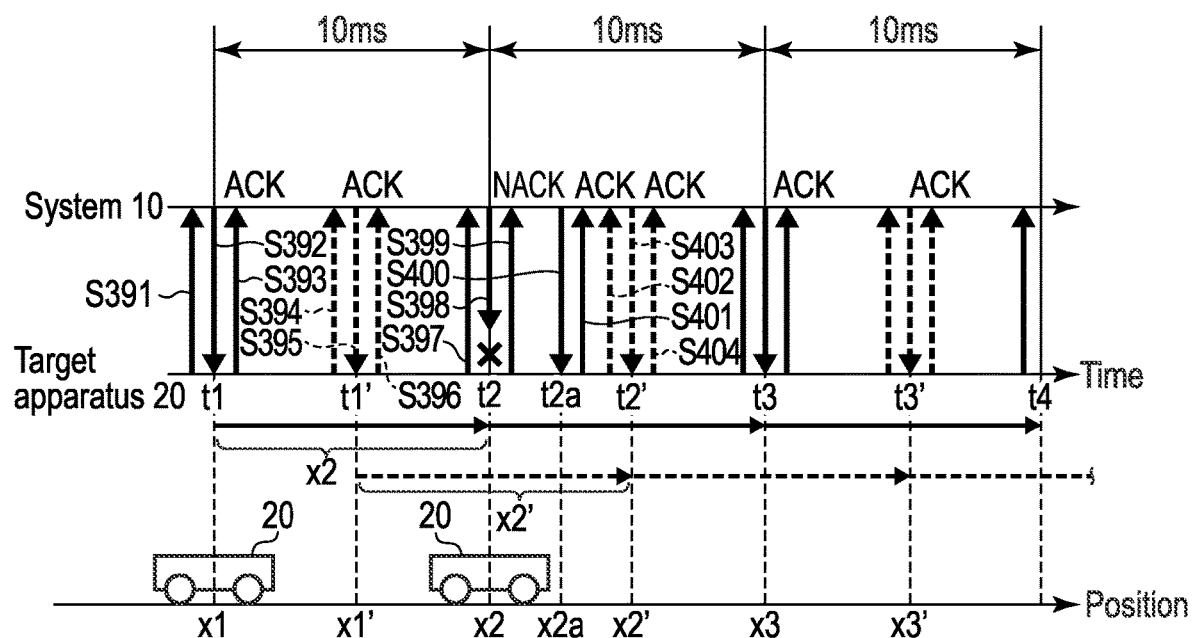
FIG. 27 is a sequence diagram showing an example of the operation of a system according to a sixth embodiment.

In the example shown in FIG. 27, a control signal is transmitted two times within a single control period. In the following description, the control signal transmitted at the start of the control period (or transmitted first in the same control period) will be referred to as a first control signal, and the control signal transmitted next to the first control signal within the control period will be referred to as a second control signal.

First, the process of step S391 corresponding to step S311 shown in FIG. 20 is performed.

At time t1, the system 10 transmits a first control signal to the target apparatus 20 (step S392). The first control signal transmitted in step S392 includes the moving speed end target position of the target apparatus 20 as described above.

It has been described in the fourth embodiment, that the control signal includes a target, position x2+α. Assume in the sixth embodiment that the first control signal transmitted in step S392 includes a target position x2. Note that the target position x2 is a position which the target apparatus 20 is to reach in the control period (10 ms) from a position x1.

When the process of step S392 is performed, the process of stop S393 corresponding to step S313 shown in FIG. 20 is performed.

Like in the above-described third embodiment, in the sixth embodiment, a second control signal is further transmitted at time t1' (time between time t1 and time t2) within the same control period as that for the first control signal transmitted in step S392.

In this case, the target apparatus 20 estimates the position (position x1') of the target apparatus 20 before the time t1' and transmits the position (signal indicative of the position) to the system 10' (step S394).

When the process of step S394 is performed, the processes of steps S395 and S386 corresponding to steps S183 and S184 shown in FIG. 13 are performed.

Note that the target position included in the second control signal transmitted in step S395 is a position (e.g., position x2') which the target apparatus 20 is to reach in 10 ms, which corresponds to the control period, from the position x1'.

When the process of step S396 is performed, the processes of steps S397 to S401 corresponding to steps S314 to S318 shown in FIG. 20 are performed, and the processes of steps S402 to S404 corresponding to steps S394 to S396 are performed. In the example shown in FIG. 27, the first control signal is transmitted at time t2, and the second control signal is transmitted at time t2, between time t2 and time t3.

As described above, in the sixth embodiment, the first control signal (first and third control signals) is transmitted in a predetermined period at time t1 (first timing) and time t2 (third timing), while the second control signal is transmitted at time t1' (second timing) between time t1 and time t2. The target position included in the first control signal transmitted at time t1 is the same as the position which the target apparatus 20 is to reach at time t2.

In the sixth embodiment, a control signal is transmitted a plurality of times (transmitted in a plurality of systems) within a single control period (frame time). Thus, even though the target apparatus 20 does not receive the first control signal transmitted in accordance with the control period, it can continue moving based on the second control signal transmitted within the last control period until the first control, signal is successfully transmitted.

The sixth embodiment thus makes it possible to control the position of the target apparatus 20 with efficiency (in other words, to prevent the moving efficiency from decreasing).

In the sixth embodiment, using the same method, the first control signal is transmitted to the target apparatus 20 at the start of the control period and the second control signal is transmitted to the target apparatus 20 after the first control signal within the control period. The first and second control signals may be transmitted by different methods.

Figure 28:
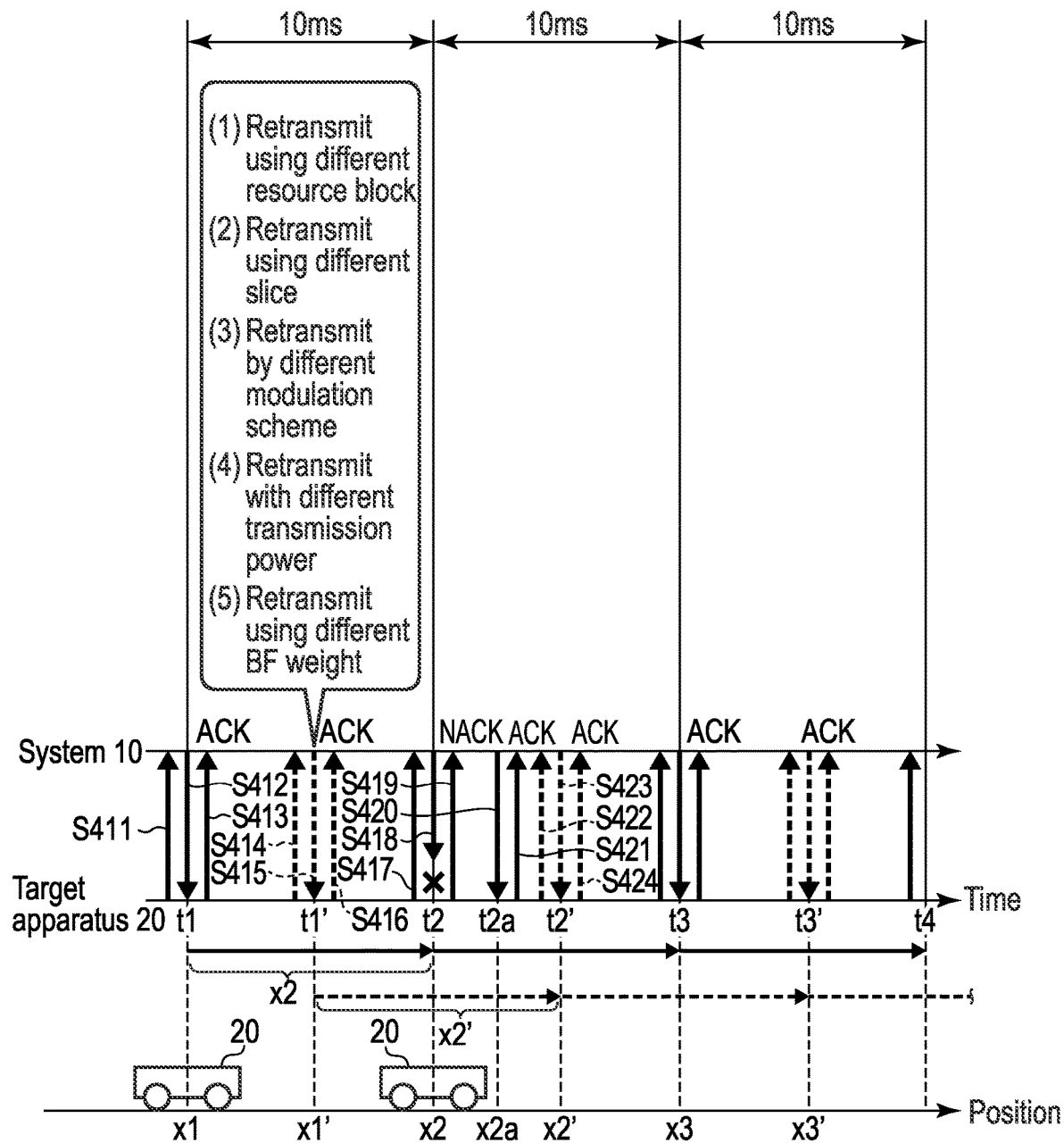
FIG. 28 is a sequence diagram showing an example of the operation of a system according to a first modification to the sixth embodiment.

An example of the operation of a system 10 according to a first modification to the sixth embodiment regarding a configuration of transmitting the first and second control signals by different methods will be described below with reference to the sequence diagram of FIG. 28.

Note that the first modification to the sixth embodiment corresponds to that to the third embodiment described above, except, that the position of the target apparatus 20 is estimated by the target apparatus 20 and the target, position is included in the control signal. In the first modification to the sixth embodiment, the same portions as those of the first modification to the third embodiment are not described in detail.

First, the processes of steps S411 to S414 corresponding to steps S391 to S394 shown in FIG. 27 are performed.

When the process of step S414 is performed, the system 10 transmits the second control signal to the target apparatus 20 at time t1' as in the process of step S395 shown in FIG. 27 (step S415). In step S415, the second control signal is transmitted by a method other than the method by which the first control signal is transmitted in step S412.

The process of step S415 differs from that in the first modification to the third embodiment in that the second control signal transmitted to the target apparatus 20 includes a target position, but otherwise it is similar to the process of step S203 shown in FIG. 14, and therefore, its detailed description will be omitted.

When the process of step S415 is performed, the processes of steps S416 to S424 corresponding to steps S396 to S404 shown in FIG. 27 are performed.

Like in the first modification to the third embodiment, in the first modification to the sixth embodiment, the second control signal is transmitted by changing at least one of the resource block, network slice, modulation method, transmission power, and transmission pattern of the antennas 13, which are used in transmitting the first control signal within the control period (using radio parameters other than those used in transmitting the first control signal). Thus, the success rate of transmission of the second control signal can be improved.

In the sixth embodiment and its first modification, the configuration in which the system 10 transmits the second control signal directly to the target apparatus 20 has been described. The second control signal may be transmitted through a path other than that in the first modification to the sixth embodiment.

Below is a description of a system 10 according to each of second and third modifications to the sixth embodiment regarding a configuration of transmitting the second control signal through a path other than that in the sixth embodiment and its first modification.

Note that the second and third modifications to the sixth embodiment correspond to those to the third embodiment described above, except that the position of the target apparatus 20 is estimated by the target apparatus and the target position is included in the control signal. In the second and third modifications to the sixth embodiment, the same portions as those of the second and third modifications to the third embodiment are not described in detail.

Figure 29:
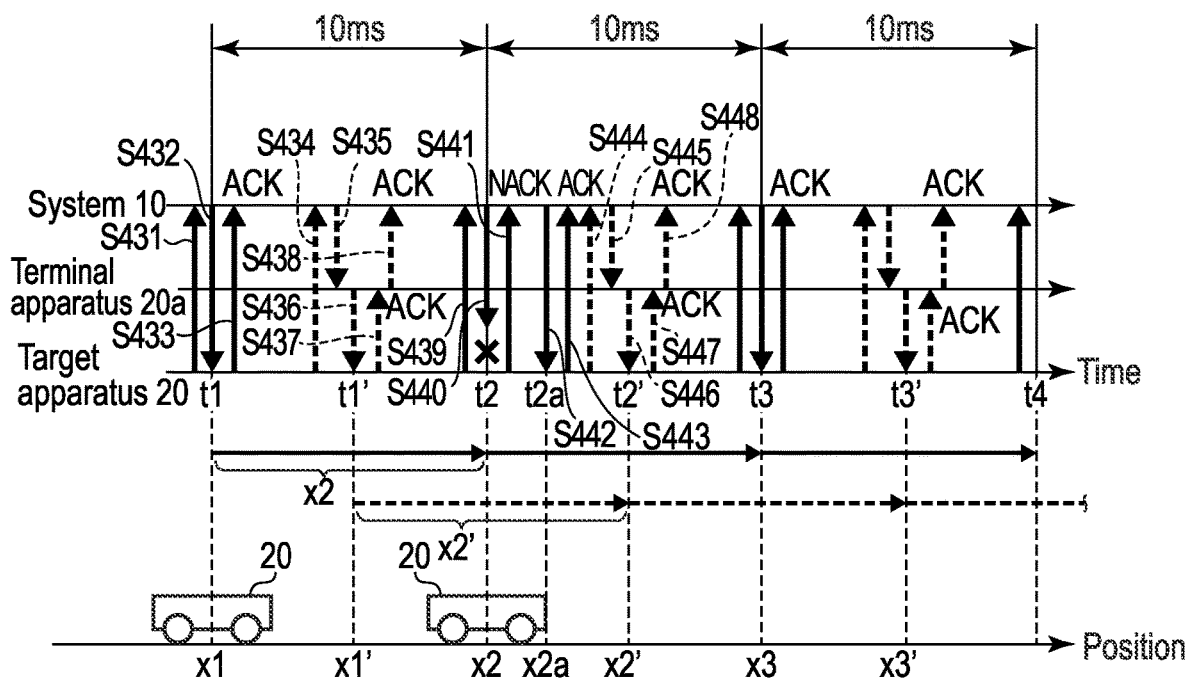
FIG. 29 is a sequence diagram showing an example of the operation of a system according to a second modification to the sixth embodiment.

An example of the operation of a system 10 according to the second modification to the sixth embodiment will be described with reference to the sequence diagram shown in FIG. 29. Assume in this second modification that the system 10 is configured to further control the movement (position) of another terminal apparatus 20a in addition to the target apparatus 20, as in the foregoing second modification to the third embodiment.

First, the processes of steps S431 to S434 corresponding to steps S391 to S394 shown in FIG. 27 are performed.

When the process of step S434 is performed, the system 10 transmits the second control signal. The second control signal is transmitted to the target apparatus 20 through the terminal apparatus 20a, as described in the second modification to the third embodiment. In this case, the processes of steps S435 to S438 are performed.

The processes of steps S437 and S438 differ from those of the second modification to the third embodiment in that the control signal transmitted to the target apparatus 20 includes a target position, but otherwise they are similar to those of steps S223 to S226 shown in FIG. 15, and therefore, their detailed descriptions will be omitted.

When the process of step S433 is performed, the processes of steps S439 to S444 corresponding to steps S397 to S402 shown in FIG. 27 are performed, and the processes of steps S445 to 448 corresponding to steps S435 to S438 described above are performed.

The foregoing second modification to the sixth embodiment is so configured that a control signal is transmitted a plurality of times (transmitted in a plurality of systems; within a single control period. If, in this configuration, the system 10 transmits a first control signal within the control period directly to the target apparatus 20 and also transmits a second control signal within the control period to the target apparatus 20 through a terminal apparatus 20a other than the target apparatus 20 (in other words, direct communication and relay communication using the terminal apparatus 20a are combined), it is possible to reduce the possibility that the transmission environments of both radio paths for transmitting the first and second control signals within the control period will worsen, with the result that the success rate of transmission of the control signals can be improved.

Figure 30:
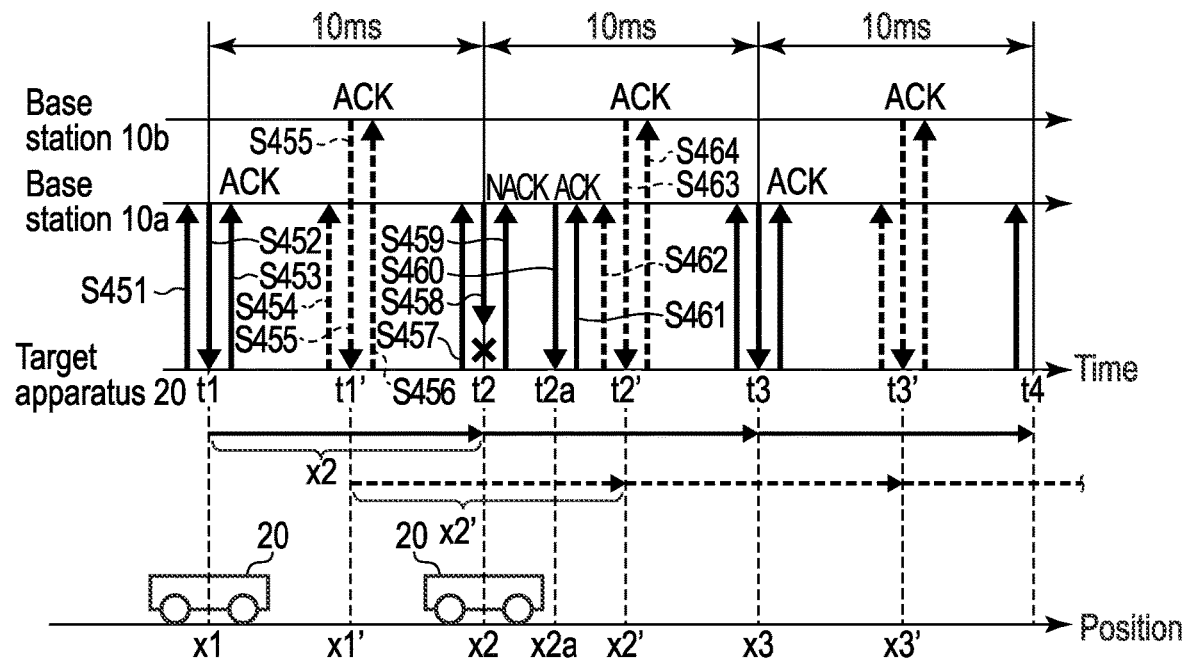
FIG. 30 is a sequence diagram showing an example of the operation of a system according to a third modification to the sixth embodiment.

An example of the operation of a system 30 according to the third modification to the third embodiment will be described with reference to the sequence diagram of FIG. 30. Assume in the third modification to the sixth embodiment that the system 10 includes base stations 10a and 10b as in the third modification to the third embodiment described above.

First, the processes of steps S451 to S454 corresponding to steps S391 to S394 shown in FIG. 27 are performed.

In step S454, the first base station 10a receives the position from the target apparatus 20 and transmit it to the server apparatus. Accordingly, the server apparatus (control signal generator 11c) generates a second control signal based on the position transmitted from the first, base station 10a. The second control signal thus generated is transmitted from the system 10 to the target apparatus 20. As described in the third modification to the third embodiment, the second control signal is transmitted from the server apparatus to the base station 10b and then transmitted from the base station 10b to the target apparatus 20. In this case, the processes of steps S455 and S456 are performed.

The processes of steps S455 and S456 differ from the third modification to the third embodiment described above in that the control signal transmitted to the target apparatus 20 includes a target position, but otherwise they are similar to those of steps S243 and S244 shown in FIG. 16, and therefore, its detailed description will be omitted.

When the process of step S456 is performed, the processes of steps S457 to S462 corresponding to steps S397 to S402 shown in FIG. 27 are performed.

In the third modification to the sixth embodiment, when the target apparatus 20 is moved, a first control signal including the target position of the target apparatus 20 is generated and transmitted to the target apparatus 20. The target position is farther than a position which the target apparatus 20 is to reach at time (second timing) when the second control signal subsequent to the first control signal is transmitted to the target apparatus 20, and the second control signal is transmitted from the base station 10b.

The third modification to the sixth embodiment is so configured that a control signal is transmitted a plurality of times (transmitted in a plurality of systems) within a single control period. If, in this configuration, the base station 10a transmits a first control signal within the control period to the target apparatus 20 and a base station 10b other than the base station 10a transmits a second control signal within the control period to the target apparatus 20 (in other words, a plurality of base stations 10a and 10b transmit the control signals to the target apparatus 20), it is possible to reduce the possibility that the transmission environments of both radio paths for transmitting the first and second control signals within the control period will worsen, with the result that the success rate of transmission of the control signals can be improved.

The configuration described in the third embodiment can be combined with that in the first embodiment. The configuration described in the sixth embodiment can also be combined with that in the fourth embodiment as appropriate. In addition, the configuration described in the sixth embodiment may be combined with that in the fifth embodiment.

At least one or the embodiments described above makes it possible to provide a system capable of controlling the position of a terminal apparatus with efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system capable of communicating with a terminal, comprising:
a processor configured to generate a first control signal including a first instruction to operate at least part of the terminal within a first validity period and generate a second control signal including a second instruction to operate at least part of the terminal within a second validity period after an operation of the at least part of the terminal in accordance with the first instruction; and
a transmitter configured to transmit the first control signal to the terminal at a first timing and transmit the second control signal to the terminal at a second timing after the first timing, wherein:
the processor is configured to generate a third control signal including a third instruction to operate at least part of the terminal within a third validity period after an operation of the at least part of the terminal in accordance with the second instruction;
the transmitter is configured to transmit the third control signal to the terminal at a third timing after the second timing; and
an end of the first validity period is after the second timing and before the third timing.

2. The system of claim 1, wherein:
the processor is configured to allocate the terminal slots indicating a time period in which the second control signal is allowed to be transmitted; and
the end of the first validity period is before a fourth timing corresponding to an end of a time period indicated by a last one of the slots allocated to the terminal between the second timing and the third timing.

3. The system of claim 1, wherein the end of the first validity period is before a fifth timing obtained by adding an average value of time, which is required until the second control signal is retransmitted, to the second timing.

4. The system of claim 1, wherein the transmitter is configured to retransmit the second control signal by the end of the first validity period when the terminal does not receive the second control signal transmitted at the second timing.

5. The system of claim 4, wherein the second control signal is retransmitted by changing at least one of a resource block, a network slice, a modulation scheme, transmission power, and a transmission pattern of antennas, which are used to transmit the second control signal at the second timing.

6. The system of claim 4, wherein the second control signal is retransmitted to the terminal through another terminal other than the terminal.

7. The system of claim 4, further comprising a first base station and a second base station other than the first base station,
wherein:
the second control signal is transmitted from the first base station; and
the second control signal is retransmitted from the second base station when the terminal does not receive the second control signal transmitted at the second timing.

8. The system of claim 1, wherein:
the first control signal and the third control signal are transmitted in a predetermined period; and
the second control signal is transmitted at the second timing between the first timing and the third timing.

9. The system of claim 8, wherein the second control signal is transmitted by changing at least one of a resource block, a network slice, a modulation scheme, transmission power, and a transmission pattern of antennas, which are used to transmit the first control signal.

10. The system of claim 8, wherein the second control signal is transmitted to the terminal through another terminal other than the terminal.

11. The system of claim 8, further comprising a first base station and a second base station other than the first base station,
wherein:
the first and third control signals are transmitted from the first base station; and
the second control signal is transmitted from the second base station.

12. A server apparatus connected to one or more base stations capable of communicating with a terminal, comprising:
a processor configured to generate a first control signal including a first instruction to operate at least part of the terminal within a first validity period and generate a second control signal including a second instruction to operate at least part of the terminal within a second validity period after an operation of the at least part of the terminal in accordance with the first instruction; and
a transmitter configured to transmit the first control signal from the one or more base stations to the terminal at a first timing and transmit the second control signal from the one or more base stations to the terminal at a second timing after the first timing,
wherein:
the processor is configured to generate a third control signal including a third instruction to operate at least part of the terminal within a third validity period after an operation of the at least part of the terminal in accordance with the second instruction;
the transmitter is configured to transmit the third control signal from the one or more base stations to the terminal at a third timing after the second timing; and
an end of the first validity period is after the second timing and before the third timing.

13. A system comprising a first base station and a second base station which are included in the one or more base stations connected to the server apparatus of claim 12,
wherein the transmitter is configured to transmit the first control signal from the first base station to the terminal at the first timing, and transmit the second control signal from the second base station to the terminal at the second timing after the first timing.

14. The system according to claim 13, wherein the transmitter is configured to transmit the third control signal from the first base station to the terminal at the third timing.

15. A system capable of communicating with a terminal, comprising:
a processor configured to generate a first control signal including a first instruction to operate at least part of the terminal within a first validity period and generate a second control signal including a second instruction to operate at least part of the terminal within a second validity period after an operation of the at least part of the terminal in accordance with the first instruction; and
a transmitter configured to transmit the first control signal to the terminal at a first timing and transmit the second control signal to the terminal at a second timing after the first timing,
wherein an end of the first validity period is after the second timing and before a fifth timing obtained by adding an average value of time, which is required until the second control signal is retransmitted, to the second timing.

16. A system capable of communicating with a terminal, comprising:
a processor configured to generate a first control signal including a first instruction to operate at least part of the terminal within a first validity period and generate a second control signal including a second instruction to operate at least part of the terminal within a second validity period after an operation of the at least part of the terminal in accordance with the first instruction; and a transmitter configured to transmit the first control signal to the terminal at a first timing and transmit the second control signal to the terminal at a second timing after the first timing, wherein:

an end of the first validity period is after the second timing, and the transmitter is configured to retransmit the second control signal by the end of the first validity period when the terminal does not receive the second control signal transmitted at the second timing.

17. The system of claim 16, wherein the second control signal is retransmitted by changing at least one of a resource block, a network slice, a modulation scheme, transmission power, and a transmission pattern of antennas, which are used to transmit the second control signal at the second timing.

18. The system of claim 16, wherein the second control signal is retransmitted to the terminal through another terminal other than the terminal.

19. The system of claim 16, further comprising a first base station and a second base station other than the first base station, wherein:

the second control signal is transmitted from the first base station; and the second control signal is retransmitted from the second base station when the terminal does not receive the second control signal transmitted at the second timing.

* * * * *